(12) United States Patent
Zhang et al.

(10) Patent No.: US 11,317,425 B2
(45) Date of Patent: Apr. 26, 2022

(54) DATA TRANSMISSION METHOD, RELATED DEVICE, AND SYSTEM

(71) Applicant: HUAWEI TECHNOLOGIES CO., LTD., Guangdong (CN)

(72) Inventors: Jinfang Zhang, Shenzhen (CN); Zhengzheng Xiang, Shanghai (CN); Hongjia Su, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 51 days.

(21) Appl. No.: 17/011,685

(22) Filed: Sep. 3, 2020

(65) Prior Publication Data

US 2020/0404681 A1 Dec. 24, 2020

Related U.S. Application Data

(63) Continuation of application No. PCT/CN2019/077886, filed on Mar. 12, 2019.

(30) Foreign Application Priority Data

Mar. 12, 2018 (CN) .......................... 201810202750.5

(51) Int. Cl.
*H04W 72/12* (2009.01)
*H04W 4/40* (2018.01)
(Continued)

(52) U.S. Cl.
CPC ............. *H04W 72/12* (2013.01); *H04W 4/40* (2018.02); *H04W 72/0446* (2013.01); *H04W 72/0453* (2013.01); *H04W 92/18* (2013.01)

(58) Field of Classification Search
CPC ... H04W 72/12; H04W 4/40; H04W 72/0446; H04W 92/18
(Continued)

(56) References Cited

U.S. PATENT DOCUMENTS

2012/0082451 A1 4/2012 Luo
2017/0079085 A1 3/2017 Yang et al.
2020/0305156 A1 9/2020 Liu et al.

FOREIGN PATENT DOCUMENTS

CN 101170743 A 4/2008
CN 102647721 A 8/2012
(Continued)

OTHER PUBLICATIONS

3GPP TS 36.213 V15.0.0 (Dec. 2017),3rd Generation Partnership Project;Technical Specification Group Radio Access Network;Evolved Universal Terrestrial Radio Access (E-UTRA);Physical layer procedures(Release 15), total 493 pages.

*Primary Examiner* — Angel T Brockman
(74) *Attorney, Agent, or Firm* — Womble Bond Dickinson (US) LLP

(57) ABSTRACT

N time-frequency resources are determined by a first communications device. Any two of the N time-frequency resources are nonconsecutive in at least one of a time domain and a frequency domain; each of the N time-frequency resources is smaller than a time-frequency resource required for transmitting to-be-transmitted data, a sum of the N time-frequency resources is greater than or equal to the time-frequency resource required for transmitting the to-be-transmitted data and N is a positive integer greater than or equal to 2. First indication information is sent on M of the N time-frequency resources. The first indication information is used to indicate that the N time-frequency resources are used to send the to-be-transmitted data, M is a positive integer less than or equal to N. The to-be-transmitted data are sent on the N time-frequency resources so that time-frequency resource utilization is improved.

20 Claims, 19 Drawing Sheets

(51) Int. Cl.
*H04W 72/04* (2009.01)
*H04W 92/18* (2009.01)

(58) Field of Classification Search
USPC .......................................................... 370/330
See application file for complete search history.

(56) References Cited

FOREIGN PATENT DOCUMENTS

| | | | |
|---|---|---|---|
| CN | 102843229 | A | 12/2012 |
| CN | 103580838 | A | 2/2014 |
| CN | 103702364 | A | 4/2014 |
| CN | 104363598 | A | 2/2015 |
| CN | 107690160 | A | 2/2018 |
| EP | 2608597 | A1 | 6/2013 |
| WO | 2017128757 | A1 | 8/2017 |

(a) Mode3 transmission mode   (b) Mode4 transmission mode

DATA TRANSMISSION METHOD, RELATED DEVICE, AND SYSTEM

CROSS-REFERENCE TO RELATED APPLICATIONS

This application is a continuation of International Application No. PCT/CN2019/077886, filed on Mar. 12, 2019, which claims priority to Chinese Patent Application No. 201810202750.5, filed on Mar. 12, 2018. The disclosures of the aforementioned applications are hereby incorporated by reference in their entireties.

TECHNICAL FIELD

This application relates to the field of communications technologies, and in particular, to a data transmission method, a related device, and a system.

BACKGROUND

An Internet of vehicles (vehicle to everything, V2X) communications system includes a vehicle-to-vehicle (V2V) intelligent transportation service, a vehicle-to-pedestrian (V2P) intelligent transportation service, a vehicle-to-infrastructure (V2I) intelligent transportation service, a vehicle-to-network (V2N) intelligent transportation service, and the like. Using V2V as an example, a V2V service uses a sidelink (SL) for communication, that is, vehicles may directly communicate with each other, and data communication between the vehicles does not need to depend on forwarding by a base station.

In the prior art, a sidelink supports only consecutive resource allocation, and does not support nonconsecutive resource allocation. That is, during V2V communication, a transmit end can send control information and data only on consecutive time-frequency resources. However, in actual application, a resource fragmentation problem inevitably occurs. A schematic diagram of resource fragmentation is shown in FIG. 1. Time-frequency resources that have been reserved and occupied in FIG. 1 are used by a transmit end to send control information and data. It can be learned from FIG. 1 that each piece of data is transmitted by using a segment of consecutive time-frequency resources. In FIG. 1, two time-frequency resources 1 and 2 that are not reserved and occupied are available time-frequency resources. The two available time-frequency resources are distributed between the reserved and occupied resources, and form fragmented time-frequency resources, which may also be referred to as nonconsecutive time-frequency resources. Because a current standard does not support nonconsecutive time-frequency resource allocation, when service data of a user arrives, if consecutive available transmission resources are not sufficient, that is, the time-frequency resource 1 is insufficient to transmit one data packet and the time-frequency resource 2 is also insufficient to transmit one data packet, and currently, sidelink transmission does not support data packet segmentation, untimely data transmission is caused, a waiting transmission delay is increased, and at the same time, the fragmented nonconsecutive time-frequency resources are not effectively used.

In this scenario, how to support nonconsecutive time-frequency resource allocation when the consecutive available time-frequency resources are insufficient to transmit one data packet but a size of nonconsecutive available time-frequency resources is greater than or equal to a size of a time-frequency resource required for transmitting one data packet, so as to reduce a data transmission delay, and improve utilization of the nonconsecutive time-frequency resources is a technical problem that needs to be resolved currently.

SUMMARY

This application provides a data transmission method, a related device, and a system, to improve time-frequency resource utilization.

According to a first aspect, an embodiment of this application provides a data transmission method, applied to a first communications device side. The method may include: determining, by a first communications device, N time-frequency resources, where any two of the N time-frequency resources are nonconsecutive in at least one of a time domain and a frequency domain; each of the N time-frequency resources is smaller than a time-frequency resource required for transmitting to-be-transmitted data, and a sum of the N time-frequency resources is greater than or equal to the time-frequency resource required for transmitting the to-be-transmitted data; and N is a positive integer greater than or equal to 2; sending, by the first communications device, first indication information on M of the N time-frequency resources, where the first indication information is used to indicate that the N time-frequency resources are used by the first communications device to send the to-be-transmitted data, and M is a positive integer less than or equal to N; and sending, by the first communications device, the to-be-transmitted data on the N time-frequency resources.

According to the method described in the first aspect, when consecutive available time-frequency resources are insufficient for transmitting one data packet, and nonconsecutive available time-frequency resources are greater than or equal to a size of a time-frequency resource required for transmitting one data packet, the first communications device performs data transmission by using the nonconsecutive time-frequency resources, and notifies, by using the first indication information, a second communications device of the nonconsecutive time-frequency resources used for data transmission. The second communications device learns of, based on the first indication information, the nonconsecutive time-frequency resources used by the first communications device for data transmission, and further receives the data sent by the first communications device from the nonconsecutive time-frequency resources. According to this application, a data transmission delay is reduced, and utilization of the nonconsecutive time-frequency resources is improved.

In a possible embodiment, the sending, by the first communications device, first indication information on M of the N time-frequency resources is: sending, by the first communications device, sidelink scheduling allocation (SA) information on M of the N time-frequency resources, where the SA carries the first indication information.

In a possible embodiment, the first indication information includes P bits corresponding to P time-frequency units; each bit is used to indicate whether one time-frequency unit is used by the first communications device to send the to-be-transmitted data; the P bits are used to indicate that a time-frequency unit that is included in the N time-frequency resources and that is in the P time-frequency units is used by the first communications device to send the to-be-transmitted data, and a time-frequency unit, other than the time-frequency unit included in the N time-frequency resources, in the P time-frequency units is not used by the first communications device to send the to-be-transmitted data; and P is a positive integer greater than or equal to N. Optionally, M may be 1. The time-frequency unit may be a subchannel. P is a total quantity of all time-frequency units included in a communication resource pool. For example, the communication resource pool is a resource pool used for V2V communication, and a quantity of all subchannels included in the communication resource pool is P.

In a possible embodiment, the first indication information includes an identifier of the first communications device and an indicator; M is equal to N, and the identifier of the first communications device is used to indicate that the N time-frequency resources are used by the first communications device to send the to-be-transmitted data; and an indicator sent on a last time-frequency resource in the N time-frequency resources is different from an indicator sent on a non-last time-frequency resource in the N time-frequency resources.

In a possible embodiment, the first indication information includes N pieces of time-frequency resource indication information; and first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources. Optionally, M may be 1.

In a possible embodiment, the time-frequency unit included in the N time-frequency resources is autonomously selected by the first communications device. Therefore, a manner in which the first communications device determines the N time-frequency resources is: selecting, by the first communications device from O time-frequency units, the time-frequency unit included in the N time-frequency resources, where O is a positive integer greater than or equal to N. In addition, O≤P. According to this embodiment of this application, the first communications device autonomously selects N nonconsecutive time-frequency resources, generates the first indication information, and notifies the second communications device of the N nonconsecutive time-frequency resources used for data transmission. Therefore, nonconsecutive time-frequency resource indication is supported, and is used for large data packet transmission, so that a transmission waiting delay of a data packet can be reduced, and the nonconsecutive time-frequency resources can be effectively used.

In a possible embodiment, the time-frequency unit included in the N time-frequency resources is configured by a network device for the first communications device. In this case, before the determining, by a first communications device, N time-frequency resources, the method further includes: receiving, by the first communications device, second indication information sent by a network device, where the second indication information is used to indicate that the N time-frequency resources are used by the first communications device to send the to-be-transmitted data. Therefore, a manner in which the first communications device determines the N time-frequency resources is: determining, by the first communications device, the N time-frequency resources based on the second indication information. According to this embodiment of this application, the network device delivers the second indication information to indicate the N nonconsecutive time-frequency resources, and the first communications device generates the first indication information based on the second indication information, to notify the second communications device of the N nonconsecutive time-frequency resources used for data transmission. Therefore, nonconsecutive time-frequency resource indication is supported, and is used for large data packet transmission, so that the transmission waiting delay of the data packet can be reduced, and the nonconsecutive time-frequency resources can be effectively used.

In a possible embodiment, the second indication information includes P bits corresponding to P time-frequency units; each bit is used to indicate whether one time-frequency unit is used by the first communications device to send the to-be-transmitted data; the P bits are used to indicate that a time-frequency unit that is included in the N time-frequency resources and that is in the P time-frequency units is used by the first communications device to send the to-be-transmitted data, and a time-frequency unit, other than the time-frequency unit included in the N time-frequency resources, in the P time-frequency units is not used by the first communications device to send the to-be-transmitted data; and P is a positive integer greater than or equal to N.

In a possible embodiment, the second indication information includes N pieces of time-frequency resource indication information; and first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources.

In a possible embodiment, the network device carries the second indication information in downlink control information DCI for sending. Correspondingly, the first communications device receives the downlink control information that carries the second indication information, and parses the downlink control information to obtain the second indication information.

In this embodiment of this application, the time-frequency unit includes a subchannel, and one subchannel includes one or more time-frequency resource blocks.

In a possible embodiment, any two of the N time-frequency resources are the same in time domain but are nonconsecutive in frequency domain.

In a possible embodiment, any two of the N time-frequency resources are consecutive in time domain and are nonconsecutive in frequency domain.

In a possible embodiment, any two of the N time-frequency resources are the same in frequency domain and are nonconsecutive in time domain.

In a possible embodiment, any two of the N time-frequency resources are consecutive in frequency domain and are nonconsecutive in time domain.

In a possible embodiment, any two of the N time-frequency resources are nonconsecutive in time domain and are also nonconsecutive in frequency domain.

In a possible embodiment, any two of the N time-frequency resources are consecutive in time domain and are also consecutive in frequency domain.

In this embodiment of this application, sizes of any two of the N time-frequency resources may be the same or may be different. This is not limited in this application.

In this embodiment of this application, each of the N time-frequency resources includes one or more time-frequency units, and the time-frequency unit may be a subchannel.

In this embodiment of this application, the time domain starting position may be a starting position of a time domain resource such as a subframe, a slot, a mini-slot, or a symbol. The time domain ending position may be an ending position of a time domain resource such as a subframe, a slot, a mini-slot, or a symbol. The frequency domain starting position may be a starting position of a frequency domain resource such as a subcarrier, a resource block (RB), or a subchannel. The frequency domain ending position may be an ending position of a frequency domain resource such as a subcarrier, a resource block, or a subchannel.

Optionally, the data transmission method provided in this application may be applied to, but is not limited to, a communications system of direct communication such as a V2V, V2P, V2I, and device-to-device (D2D) communications system.

Optionally, the data transmission method provided in this application may be applied to a transmission scenario of a mode3 mode or a mode4 mode between communications devices, or may be applied to a transmission scenario in which the mode3 mode and the mode4 mode coexist.

According to a second aspect, an embodiment of this application provides a data transmission method, applied to a second communications device side. The method may include: receiving, by a second communications device, first indication information on M of N time-frequency resources, where the first indication information is used to indicate that the N time-frequency resources are used by a first communications device to send to-be-transmitted data; any two of the N time-frequency resources are nonconsecutive in at least one of a time domain and a frequency domain; each of the N time-frequency resources is smaller than a time-frequency resource required for transmitting the to-be-transmitted data, and a sum of the N time-frequency resources is greater than or equal to the time-frequency resource required for transmitting the to-be-transmitted data; and N is a positive integer greater than or equal to 2, and M is a positive integer less than or equal to N; and receiving, by the second communications device, the to-be-transmitted data on the N time-frequency resources.

According to the method described in the second aspect, when consecutive available time-frequency resources are insufficient for transmitting one data packet, and nonconsecutive available time-frequency resources are greater than or equal to a size of a time-frequency resource required for transmitting one data packet, the first communications device performs data transmission by using the nonconsecutive time-frequency resources, and notifies, by using the first indication information, the second communications device of the nonconsecutive time-frequency resources used for data transmission. The second communications device learns of, based on the first indication information, the nonconsecutive time-frequency resources used by the first communications device for data transmission, and further receives the data sent by the first communications device from the nonconsecutive time-frequency resources. According to this application, a data transmission delay is reduced, and utilization of the nonconsecutive time-frequency resources is improved.

In a possible embodiment, the receiving, by a second communications device, first indication information on M of N time-frequency resources is: receiving, by the second communications device, SA on M of the N time-frequency resources, where the SA carries the first indication information.

In a possible embodiment, the first indication information includes P bits corresponding to P time-frequency units; each bit is used to indicate whether one time-frequency unit is used by the first communications device to send the to-be-transmitted data; the P bits are used to indicate that a time-frequency unit that is included in the N time-frequency resources and that is in the P time-frequency units is used by the first communications device to send the to-be-transmitted data, and a time-frequency unit, other than the time-frequency unit included in the N time-frequency resources, in the P time-frequency units is not used by the first communications device to send the to-be-transmitted data; and P is a positive integer greater than or equal to N. Optionally, M may be 1. The time-frequency unit may be a subchannel. P is a total quantity of all time-frequency units included in a communication resource pool. For example, the communication resource pool is a resource pool used for V2V communication, and a quantity of all subchannels included in the communication resource pool is P.

In a possible embodiment, the first indication information includes an identifier of the first communications device and an indicator; M is equal to N, and the identifier of the first communications device is used to indicate that the N time-frequency resources are used by the first communications device to send the to-be-transmitted data; and an indicator sent on a last time-frequency resource in the N time-frequency resources is different from an indicator sent on a non-last time-frequency resource in the N time-frequency resources.

In a possible embodiment, the first indication information includes N pieces of time-frequency resource indication information; and first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources. Optionally, M may be 1.

In a possible embodiment, the time-frequency unit included in the N time-frequency resources is selected by the first communications device from O time-frequency units, and O is a positive integer greater than or equal to N. In addition, O≤P. According to this embodiment of this application, the second communications device learns, based on the first indication information, that the first communications device autonomously selects N nonconsecutive time-frequency resources. Therefore, nonconsecutive time-frequency resource indication is supported, and is used for large data packet transmission, so that a transmission waiting delay of a data packet can be reduced, and the nonconsecutive time-frequency resources can be effectively used.

In a possible embodiment, the N time-frequency resources are determined by the first communications device based on second indication information sent by a network device, and the second indication information is used to indicate that the N time-frequency resources are used by the first communications device to send the to-be-transmitted data. According to this embodiment of this application, the network device delivers the second indication information to indicate the N nonconsecutive time-frequency resources, and the first communications device generates the first indication information based on the second indication information, and the second communications device learns of, based on the first indication information, the N nonconsecutive time-frequency resources used by the first communications device to transmit data. Therefore, nonconsecutive time-frequency resource indication is supported, and is used for large data packet transmission, so that the transmission waiting delay of the data packet can be reduced, and the nonconsecutive time-frequency resources can be effectively used.

In a possible embodiment, the second indication information includes P bits corresponding to P time-frequency units; each bit is used to indicate whether one time-frequency unit is used by the first communications device to send the to-be-transmitted data; the P bits are used to indicate that a time-frequency unit that is included in the N time-frequency resources and that is in the P time-frequency units is used by the first communications device to send the to-be-transmitted data, and a time-frequency unit, other than the time-frequency unit included in the N time-frequency resources, in the P time-frequency units is not used by the first communications device to send the to-be-transmitted data; and P is a positive integer greater than or equal to N.

In a possible embodiment, the second indication information includes N pieces of time-frequency resource indication information; and first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources.

In this embodiment of this application, the time-frequency unit includes a subchannel, and one subchannel includes one or more time-frequency resource blocks.

In a possible embodiment, any two of the N time-frequency resources are the same in time domain but are nonconsecutive in frequency domain.

In a possible embodiment, any two of the N time-frequency resources are consecutive in time domain and are nonconsecutive in frequency domain.

In a possible embodiment, any two of the N time-frequency resources are the same in frequency domain and are nonconsecutive in time domain.

In a possible embodiment, any two of the N time-frequency resources are consecutive in frequency domain and are nonconsecutive in time domain.

In a possible embodiment, any two of the N time-frequency resources are nonconsecutive in time domain and are also nonconsecutive in frequency domain.

In a possible embodiment, any two of the N time-frequency resources are consecutive in time domain and are also consecutive in frequency domain.

In this embodiment of this application, sizes of any two of the N time-frequency resources may be the same or may be different. This is not limited in this application.

In this embodiment of this application, each of the N time-frequency resources includes one or more time-frequency units, and the time-frequency unit may be a subchannel.

In this embodiment of this application, the time domain starting position may be a starting position of a time domain resource such as a subframe, a slot, a mini-slot, or a symbol. The time domain ending position may be an ending position of a time domain resource such as a subframe, a slot, a mini-slot, or a symbol. The frequency domain starting position may be a starting position of a frequency domain resource such as a subcarrier, a resource block, or a subchannel. The frequency domain ending position may be an ending position of a frequency domain resource such as a subcarrier, a resource block, or a subchannel.

Optionally, the data transmission method provided in this application may be applied to, but is not limited to, a communications system of direct communication such as a V2V communications system, a V2P communications system, a V2I communications system, and a D2D communications system.

Optionally, the data transmission method provided in this application may be applied to a transmission scenario of a mode3 mode or a mode4 mode between communications devices, or may be applied to a transmission scenario in which the mode3 mode and the mode4 mode coexist.

According to a third aspect, an embodiment of this application provides a communications device. The communications device is a first communications device, and the first communications device may include a plurality of functional modules or units, configured to correspondingly perform the data transmission method provided in the first aspect.

For example, the first communications device includes:

a determining unit, configured to determine N time-frequency resources, where any two of the N time-frequency resources are nonconsecutive in at least one of a time domain and a frequency domain; each of the N time-frequency resources is smaller than a time-frequency resource required for transmitting to-be-transmitted data, and a sum of the N time-frequency resources is greater than or equal to the time-frequency resource required for transmitting the to-be-transmitted data; and N is a positive integer greater than or equal to 2; and a sending unit, configured to send first indication information on M of the N time-frequency resources, where the first indication information is used to indicate that the N time-frequency resources are used by the first communications device to send the to-be-transmitted data, and M is a positive integer less than or equal to N; and the sending unit is further configured to send the to-be-transmitted data on the N time-frequency resources.

In a possible embodiment, that a sending unit is configured to send first indication information on M of the N time-frequency resources is:

sending sidelink scheduling allocation information SA on M of the N time-frequency resources, where the SA carries the first indication information.

In a possible embodiment, the first indication information includes P bits corresponding to P time-frequency units; each bit is used to indicate whether one time-frequency unit is used by the first communications device to send the to-be-transmitted data; the P bits are used to indicate that a time-frequency unit that is included in the N time-frequency resources and that is in the P time-frequency units is used by the first communications device to send the to-be-transmitted data, and a time-frequency unit, other than the time-frequency unit included in the N time-frequency resources, in the P time-frequency units is not used by the first communications device to send the to-be-transmitted data; and P is a positive integer greater than or equal to N.

In a possible embodiment, the first indication information includes an identifier of the first communications device and an indicator; M is equal to N, and the identifier of the first communications device is used to indicate that the N time-frequency resources are used by the first communications device to send the to-be-transmitted data; and an indicator sent on a last time-frequency resource in the N time-frequency resources is different from an indicator sent on a non-last time-frequency resource in the N time-frequency resources.

In a possible embodiment, the first indication information includes N pieces of time-frequency resource indication information; and first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources.

In a possible embodiment, the determining unit is configured to select, from O time-frequency units, the time-frequency unit included in the N time-frequency resources, and O is a positive integer greater than or equal to N.

In a possible embodiment, the first communications device further includes:

a receiving unit, configured to receive second indication information sent by a network device, where the second indication information is used to indicate that the N time-frequency resources are used by the first communications device to send the to-be-transmitted data; and the determining unit is configured to determine the N time-frequency resources based on the second indication information.

In a possible embodiment, the second indication information includes P bits corresponding to P time-frequency units; each bit is used to indicate whether one time-frequency unit is used by the first communications device to send the to-be-transmitted data; the P bits are used to indicate that a time-frequency unit that is included in the N time-frequency resources and that is in the P time-frequency units is used by the first communications device to send the to-be-transmitted data, and a time-frequency unit, other than the time-frequency unit included in the N time-frequency resources, in the P time-frequency units is not used by the first communications device to send the to-be-transmitted data; and P is a positive integer greater than or equal to N.

In a possible embodiment, the second indication information includes N pieces of time-frequency resource indication information; and first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources.

In a possible embodiment, the time-frequency unit includes a subchannel, and one subchannel includes one or more time-frequency resource blocks.

According to a fourth aspect, an embodiment of this application provides a communications device. The communications device is a second communications device, and the second communications device may include a plurality of functional modules or units, configured to correspondingly perform the data transmission method provided in the second aspect.

For example, the second communications device includes:

a receiving unit, configured to receive first indication information on M of N time-frequency resources, where the first indication information is used to indicate that the N time-frequency resources are used by a first communications device to send to-be-transmitted data; any two of the N time-frequency resources are nonconsecutive in at least one of a time domain and a frequency domain; each of the N time-frequency resources is smaller than a time-frequency resource required for transmitting the to-be-transmitted data, and a sum of the N time-frequency resources is greater than or equal to the time-frequency resource required for transmitting the to-be-transmitted data; and N is a positive integer greater than or equal to 2, and M is a positive integer less than or equal to N; and the receiving unit is further configured to receive the to-be-transmitted data on the N time-frequency resources.

In a possible embodiment, that a sending unit is configured to send first indication information on M of the N time-frequency resources is:

receiving sidelink scheduling allocation information SA on M of the N time-frequency resources, where the SA carries the first indication information.

In a possible embodiment, the first indication information includes P bits corresponding to P time-frequency units; each bit is used to indicate whether one time-frequency unit is used by the first communications device to send the to-be-transmitted data; the P bits are used to indicate that a time-frequency unit that is included in the N time-frequency resources and that is in the P time-frequency units is used by the first communications device to send the to-be-transmitted data, and a time-frequency unit, other than the time-frequency unit included in the N time-frequency resources, in the P time-frequency units is not used by the first communications device to send the to-be-transmitted data; and P is a positive integer greater than or equal to N.

In a possible embodiment, the first indication information includes an identifier of the first communications device and an indicator; M is equal to N, and the identifier of the first communications device is used to indicate that the N time-frequency resources are used by the first communications device to send the to-be-transmitted data; and an indicator sent on a last time-frequency resource in the N time-frequency resources is different from an indicator sent on a non-last time-frequency resource in the N time-frequency resources.

In a possible embodiment, the first indication information includes N pieces of time-frequency resource indication information; and first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources.

In a possible embodiment, the time-frequency unit included in the N time-frequency resources is selected by the first communications device from O time-frequency units, and O is a positive integer greater than or equal to N.

In a possible embodiment, the N time-frequency resources are determined by the first communications device based on second indication information sent by a network device, and the second indication information is used to indicate that the N time-frequency resources are used by the first communications device to send the to-be-transmitted data.

In a possible embodiment, the second indication information includes P bits corresponding to P time-frequency units; each bit is used to indicate whether one time-frequency unit is used by the first communications device to send the to-be-transmitted data; the P bits are used to indicate that a time-frequency unit that is included in the N time-frequency resources and that is in the P time-frequency units is used by the first communications device to send the to-be-transmitted data, and a time-frequency unit, other than the time-frequency unit included in the N time-frequency resources, in the P time-frequency units is not used by the first communications device to send the to-be-transmitted data; and P is a positive integer greater than or equal to N.

In a possible embodiment, the second indication information includes N pieces of time-frequency resource indication information; and first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources.

In a possible embodiment, the time-frequency unit includes a subchannel, and one subchannel includes one or more time-frequency resource blocks.

According to a fifth aspect, an embodiment of this application provides a communications device. The communications device is a first communications device, configured to perform the data transmission method provided in the first aspect. The first communications device may include a memory, a processor, a transmitter, and a receiver, where the transmitter and the receiver are configured to communicate with another communications device (for example, a network device or a second communications device). The memory is configured to store implementation code of the data transmission method provided in the first aspect, and the processor is configured to execute program code stored in the memory, that is, perform the data transmission method provided in the first aspect.

According to a sixth aspect, an embodiment of this application provides a communications device. The communications device is a second communications device, configured to perform the data transmission method provided in the second aspect. The second communications device may include a memory, a processor, a transmitter, and a receiver, where the transmitter and the receiver are configured to communicate with another communications device (for example, a network device or a first communications device). The memory is configured to store implementation code of the data transmission method provided in the second aspect, and the processor is configured to execute program code stored in the memory, that is, perform the data transmission method provided in the second aspect.

According to a seventh aspect, an embodiment of this application provides a communications system. The communications system includes a first communications device and a second communications device.

The first communications device may be the first communications device described in the third aspect, or may be the first communications device described in the fifth aspect.

The second communications device may be the first communications device described in the fourth aspect, or may be the second communications device described in the sixth aspect.

According to an eighth aspect, an embodiment of this application provides a communications system. The communications system includes a first communications device, a second communications device, and a network device.

The first communications device may be the first communications device described in the third aspect, or may be the first communications device described in the fifth aspect.

The second communications device may be the first communications device described in the fourth aspect, or may be the second communications device described in the sixth aspect.

According to a ninth aspect, this application provides a communications chip. The communications chip may include a processor and one or more interfaces coupled to the processor. The processor may be configured to invoke, from a memory, a program for implementing the data transmission method provided in the first aspect, and execute an instruction included in the program. The interfaces may be configured to output a data processing result of the processor.

According to a tenth aspect, this application provides a communications chip. The communications chip may include a processor and one or more interfaces coupled to the processor. The processor may be configured to invoke, from a memory, a program for implementing the data transmission method provided in the second aspect, and execute an instruction included in the program. The interfaces may be configured to output a data processing result of the processor.

According to an eleventh aspect, an embodiment of this application provides a computer-readable storage medium. The readable storage medium stores an instruction, and when the instruction is run on a processor, the processor is enabled to perform the data transmission method described in the first aspect.

According to a twelfth aspect, an embodiment of this application provides a computer-readable storage medium. The readable storage medium stores an instruction, and when the instruction is run on a processor, the processor is enabled to perform the data transmission method described in the second aspect.

According to a thirteenth aspect, an embodiment of this application provides a computer program product that includes an instruction. When the computer program product runs on a processor, the processor is enabled to perform the data transmission method described in the first aspect.

According to a fourteenth aspect, an embodiment of this application provides a computer program product that includes an instruction. When the computer program product runs on a processor, the processor is enabled to perform the data transmission method described in the second aspect.

DESCRIPTION OF EMBODIMENTS

The following describes the embodiments of this application with reference to accompanying drawings in the embodiments of this application.

Figure 1:
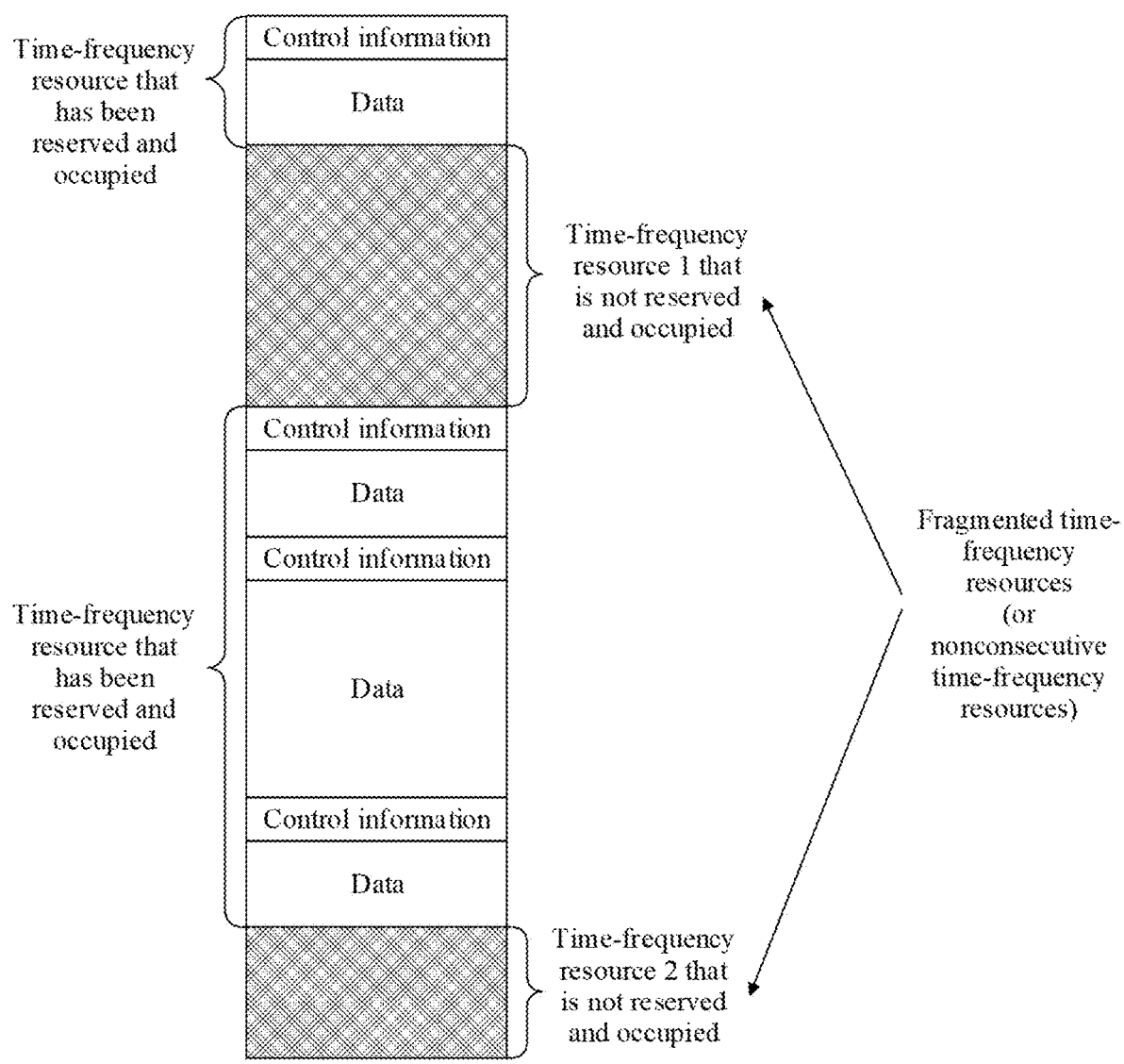
FIG. 1 is a schematic diagram of resource fragmentation according to an embodiment of this application.
Figure 2:
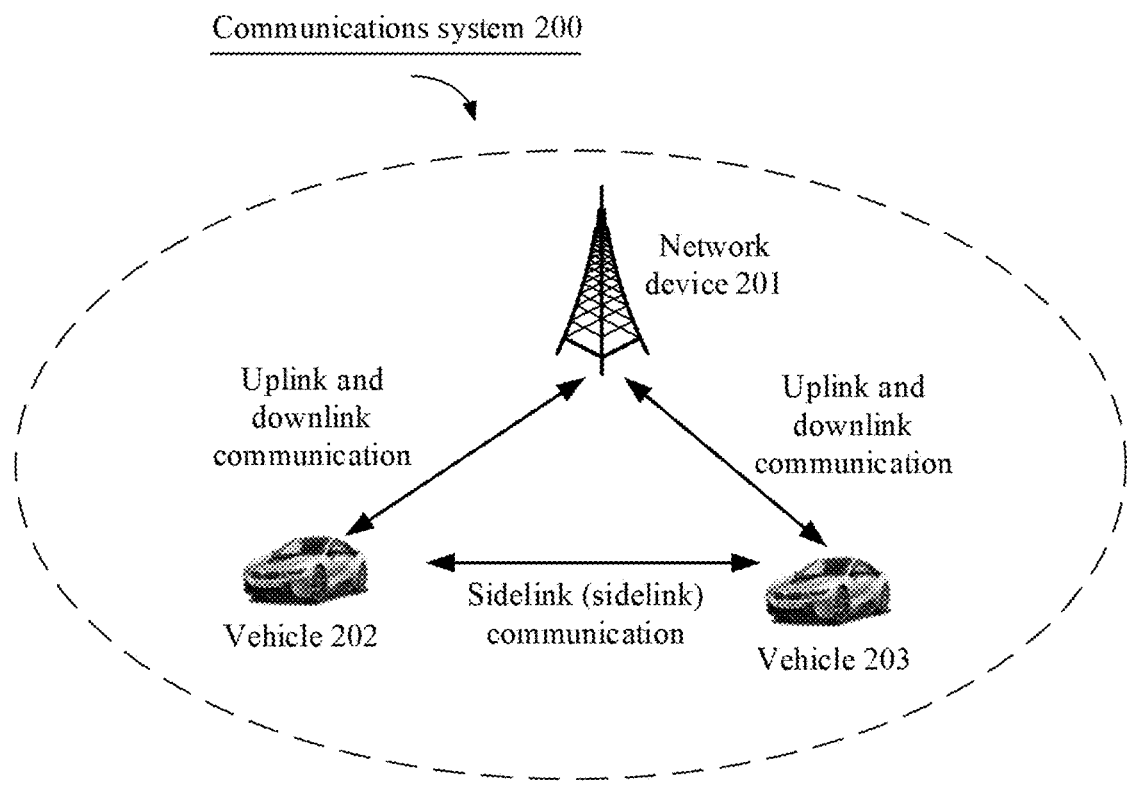
FIG. 2 is a schematic architectural diagram of a communications system according to an embodiment of this application.

FIG. 2 is a schematic architectural diagram of a communications system 200 according to an embodiment of this application. As shown in FIG. 2, an architecture of the communications system 200 includes V2V communication and vehicle to network (V2N) communication. The communications system includes a network device 201, a vehicle 202, and a vehicle 203. The V2V communication includes communication between the vehicle 202 and the vehicle 203. The V2N communication includes communication between the vehicle 202 or the vehicle 203 and the network device 201. In this embodiment of this application, two vehicles are used as an example for description. In actual application, the communications system may further include more vehicles.

In a V2X communication scenario, vehicles may communicate with each other through a sidelink (SL). SL communication is direct communication between vehicles. In other words, the vehicles directly communicate with each other without forwarding data by the network device. The V2N vehicle to network communication uses an uplink and a downlink. The uplink and the downlink are defined for a Uu interface for communication between a network device and a user. Transmission from the network device to the user is downlink (DL) transmission, and transmission from the user to the network device is uplink (UL) transmission.

Figure 3:
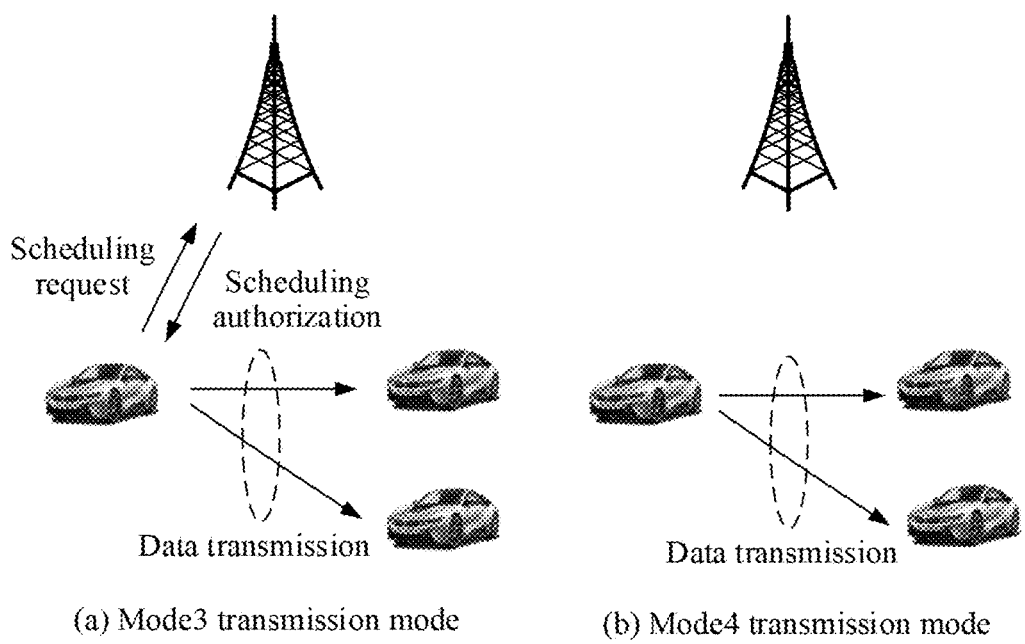
FIG. 3 is a schematic diagram of transmission modes of a mode3 and a mode4 according to an embodiment of this application.

V2X sidelink communication includes two communication modes: A first communication mode is V2X direct communication scheduled by a network device, where a V2X user sends control information and data of V2X communication on a scheduled time-frequency resource based on scheduling information of the network device, which is referred to as a mode3 working mode; and a second communication mode is a mode4 working mode in which a V2X user autonomously selects, from available time-frequency resources included in a V2X communication resource pool, a time-frequency resource used for communication, and sends control information and data on the selected resource. It should be noted that in the mode3 mode, a scheduling request/scheduling grant still uses the uplink and the downlink between the network device and the user for communication, and the vehicles directly communicate with each other by using the sidelink. The two communication modes have advantages and disadvantages, and can be flexibly applied to various scenarios. For a schematic diagram of transmission modes of the mode3 and the mode4, refer to FIG. 3.

Figure 4:
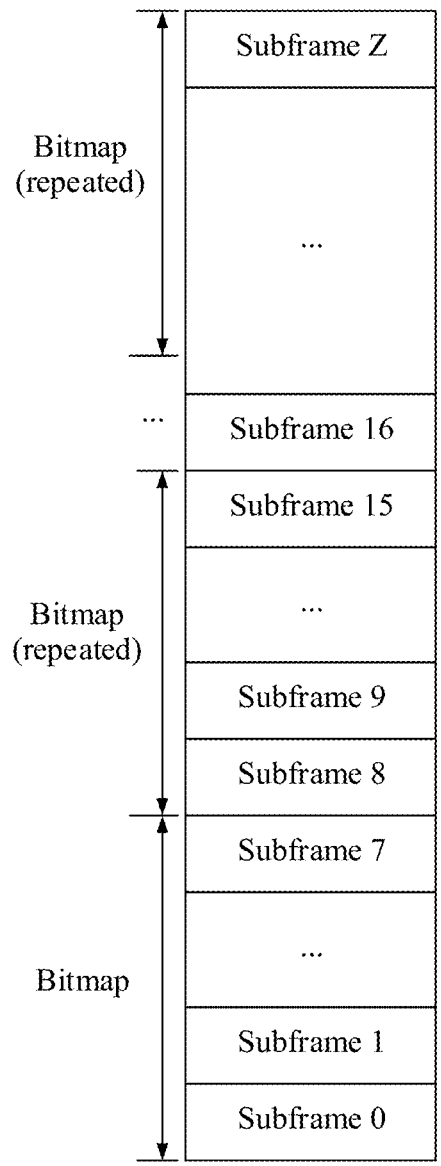
FIG. 4 is a schematic diagram of periodically indicating a time resource in a communication resource pool according to an embodiment of this application.

A time-frequency resource for V2X communication is configured based on the V2X communication resource pool. The V2X communication resource pool may be considered as a set of a time resource (or referred to as a time domain resource) and a frequency resource (or referred to as a frequency domain resource) that are used for V2X communication. In an embodiment, for the time resource, the network device uses a bitmap and periodically repeats the bitmap to indicate a set of time resources used for V2X communication in all time resources in a system. In this embodiment of this application, the time resource includes but is not limited to a subframe, a slot, a mini-slot, a symbol, and the like. FIG. 4 is a schematic diagram (a length of a bitmap is 8 bits) of periodically indicating a time resource in a communication resource pool. For example, for a first bitmap in FIG. 4, if the bitmap is 11001110, and a time resource is a subframe, it indicates that a subframe 0, a subframe 1, a subframe 4, a subframe 5, and a subframe 6 are used for V2X communication. In the bitmap 11001110, 1 indicates that a subframe corresponding to the bit is used for V2X communication, and 0 indicates that a subframe corresponding to the bit is not used for V2X communication. A number 0, 1, or the like in the subframe 0, the subframe 1, or the like represents a number of a subframe.

Figure 5:
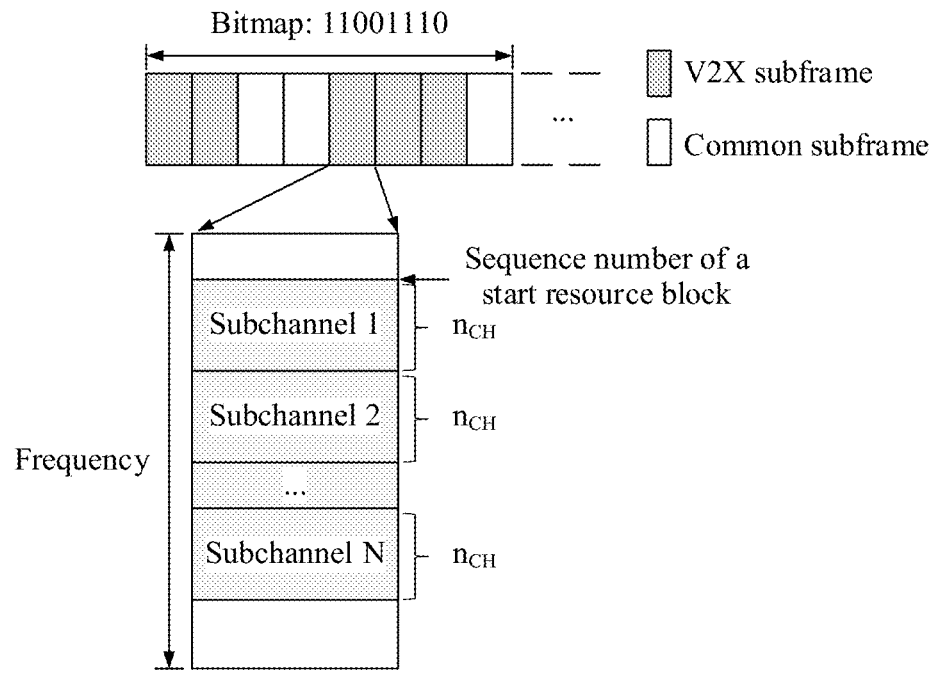
FIG. 5 is a schematic diagram of a frequency resource in a communication resource pool according to an embodiment of this application.

For a frequency resource in a V2X communication resource pool, a network device divides a frequency band used for V2X communication into several subchannels, and each subchannel includes a particular quantity of resource blocks. FIG. 5 is a schematic diagram of a frequency resource in a communication resource pool. The communication resource pool includes a total quantity X of subchannels, and each subchannel includes a quantity not of resource blocks. One time of V2X transmission may occupy one or more subchannels, and is used to transmit sidelink scheduling allocation information and user data. Control information and the user data may be multiplexed in a frequency division mode, or may be multiplexed in a time division mode.

The data transmission method in the embodiments of this application may be applied to a V2V communications system, or may be applied to a communications system of direct communication, for example, a vehicle to pedestrian (V2P) communications system, a vehicle to infrastructure (V2I) communications system, and a device-to-device (D2D) communications system. The data transmission method in the embodiments of this application may be used in a transmission scenario of a mode3 mode or a mode4 mode between communications devices, or may be applied to a transmission scenario in which the mode3 mode and the mode4 mode coexist.

The network device in this embodiment of this application may include network devices in various forms, for example, a macro base station, a micro base station (also referred to as a small cell), a relay station, and an access point. A base station may be a base transceiver station (BTS) in a time division synchronous code division multiple access (TD-SCDMA) system, or may be an evolved NodeB (Evolutional NodeB, eNB) in a long term evolution (LTE) system, or a gNB in a 5G system and a new radio (NR) system. In addition, the base station may alternatively be a transmission receive point (TRP), a central unit (CU), or another network entity. In addition, in a distributed base station scenario, the network device may be a baseband unit (BBU) and a radio frequency unit (RRU). In a cloud radio access network (CRAN) scenario, the network device may be a baseband pool BBU pool and a radio frequency unit RRU.

The first communications device and the second communications device in the embodiments of this application may be a vehicle, a vehicle-mounted terminal, a vehicle-mounted device, a vehicle-mounted communications module, an embedded communications module, a baseband processing chip, user equipment (UE), a handheld terminal, a subscriber unit, a wireless data card, a wireless modem, a handheld device, a wireless local loop ( ) station, a machine type communication (MTC) terminal, or another device.

It should be noted that the communications system 200 shown in FIG. 2 is merely intended to more clearly describe technical solutions in this application, but is not intended to limit this application. A person of ordinary skill in the art may know that as a network architecture evolves and a new service scenario emerges, the technical solutions provided in this application are further applicable to a similar technical problem.

Figure 6:
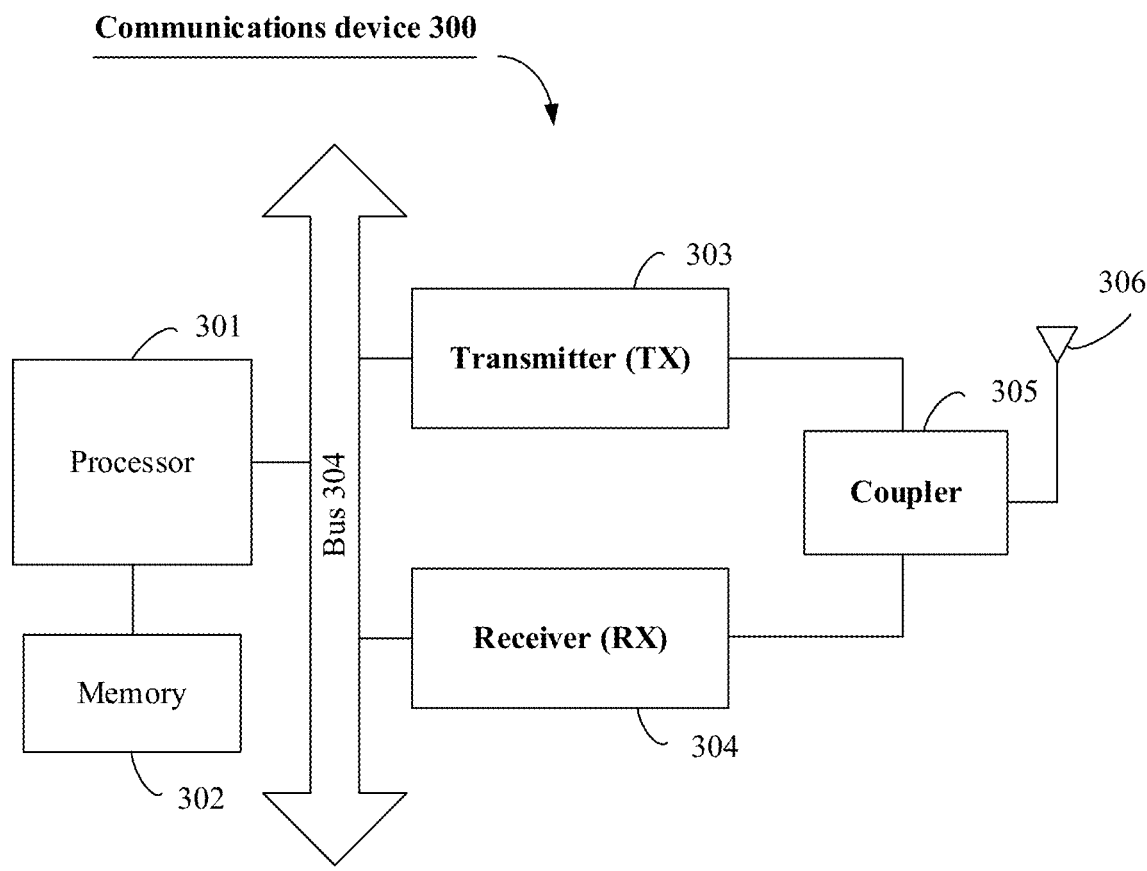
FIG. 6 is a schematic structural diagram of a communications device according to an embodiment of this application.

FIG. 6 shows a communications device according to some embodiments of this application. As shown in FIG. 6, a communications device 300 may include one or more processors 301, a memory 302, a transmitter 303, a receiver 304, a coupler 305, and an antenna 306. These components may be connected by using a bus 307 or in another manner. In FIG. 6, an example in which the components are connected by using the bus is used.

The processor 301 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof.

The memory 302 may include a volatile memory such as a random access memory (RAM); or the memory 302 may include a non-volatile memory (non-volatile memory) such as a read-only memory (ROM), a flash memory, a hard disk drive (HDD), or a solid-state drive (SSD); or the memory 302 may include a combination of the foregoing types of memories.

The transmitter 303 may be configured to perform transmission processing, for example, signal modulation and encoding, on a signal output by the communications device 300. The receiver 304 may be configured to perform receiving processing, for example, signal demodulation and decoding, on a mobile communication signal received by the antenna 306. In some embodiments of this application, the transmitter 303 and the receiver 304 may be considered as a wireless modem. The communications device 300 may include one or more transmitters 303 and one or more receivers 304. The antenna 306 may be configured to convert electromagnetic energy in a transmission line into an electromagnetic wave in free space, or convert an electromagnetic wave in free space into electromagnetic energy in a transmission line. The coupler 305 is configured to: divide the mobile communication signal received by the antenna 306 into a plurality of signals, and allocate the plurality of signals to a plurality of receivers 304.

In addition to the transmitter 303 and the receiver 304 shown in FIG. 6, the communications device 300 may further include another communications component, such as a global positioning system (GPS) module, a Bluetooth module, and a wireless fidelity (Wi-Fi) module. Not limited to the foregoing mobile communication signal, the communications device 300 may further support another wireless communication signal, for example, a satellite signal, or a short-wave signal.

Optionally, the communications device 300 may further include a user interface.

Optionally, the communications device 300 may further include an input/output module (including an audio input/output module, a key input module, a display, and the like). The input/output module may be configured to implement interaction between the communications device 300 and a user/an external environment, and may mainly include the audio input/output module, the key input module, the display, and the like. In an embodiment, the input/output module may further include a camera, a touchscreen, a sensor, and the like. All the input/output modules communicate with the processor 301 by using the user interface.

In some embodiments of this application, the memory 302 may be configured to store a program for implementing the data transmission method provided in one or more embodiments of this application on a communications apparatus 300 side. For implementation of the data transmission method provided in the one or more embodiments of this application, refer to the following embodiments.

The processor 301 may be configured to read and execute a computer-readable instruction. In an embodiment, the processor 301 may be configured to invoke a program stored in the memory 302, for example, a program for implementing, on the communications device 300 side, the data transmission method provided in one or more embodiments of this application, and execute an instruction included in the program.

It may be understood that the communications device 300 may be the vehicle 202 or the vehicle 203 in the communications system 200 shown in FIG. 2, and may be implemented as a vehicle, a vehicle-mounted terminal, a vehicle-mounted device, a vehicle-mounted communications module, an embedded communications module, a baseband processing chip, user equipment (UE), a handheld terminal, a subscriber unit, a wireless data card, a wireless modem, a handheld device, a wireless local loop (WLL) station, a machine type communication (MTC) terminal, or another device. A memory of the vehicle 202 or the vehicle 203 stores one or more software modules (for example, an interaction module and a processing module), to implement the data transmission method in the embodiments of this application.

It should be noted that the communications device 300 shown in FIG. 6 is only an implementation of this embodiment of this application. In actual application, the communications device 300 may further include more or fewer components, and this is not limited herein.

Based on the embodiments corresponding to the communications system 200 and the communications device 300, an embodiment of this application provides a data transmission method.

When consecutive available time-frequency resources are insufficient to transmit one data packet, but a size of nonconsecutive available time-frequency resources is greater than or equal to a size of a time-frequency resource required for transmitting one data packet, nonconsecutive time-frequency resource allocation is supported, and the nonconsecutive time-frequency resources are used for data transmission. The consecutive time-frequency resources include at least two time-frequency resources that are the same in time domain and consecutive in frequency domain, or at least two time-frequency resources that are the same in frequency domain and consecutive in time domain. The nonconsecutive time-frequency resources include at least two time-frequency resources that are nonconsecutive in at least one of the time domain and the frequency domain. The following describes several cases related to the nonconsecutive time-frequency resources in the embodiments of this application with reference to FIG. 7A to FIG. 7F.

Figure 7A:
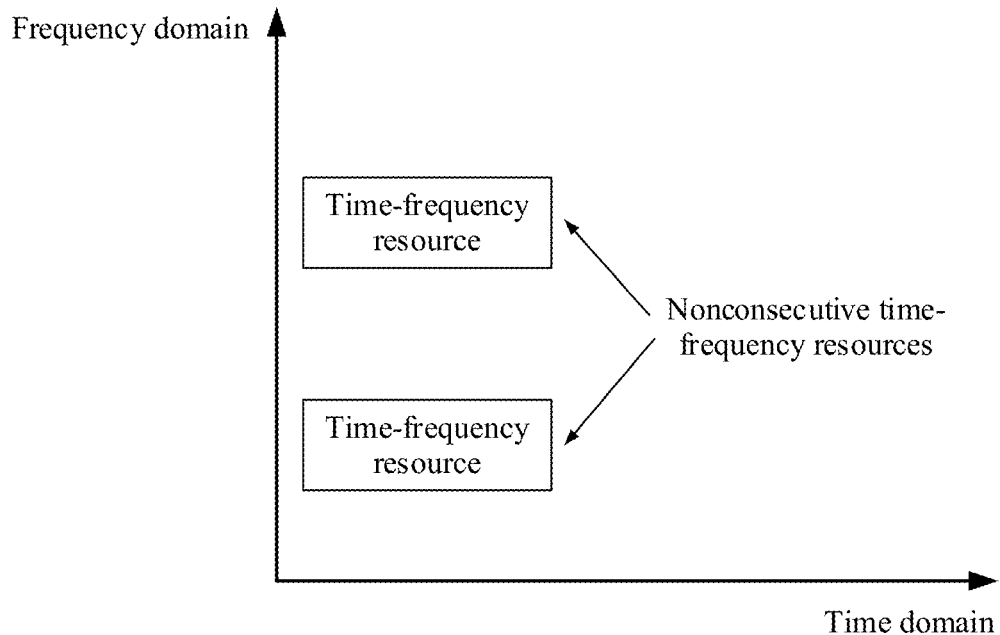
FIG. 7A is a schematic diagram of nonconsecutive time-frequency resources according to an embodiment of this application.

In an embodiment, nonconsecutive time-frequency resources are time-frequency resources that are the same in time domain and nonconsecutive in frequency domain. In an embodiment, refer to a schematic diagram of the nonconsecutive time-frequency resources shown in FIG. 7A. In FIG. 7A, two time-frequency resources are used as an example for description. In actual application, the nonconsecutive time-frequency resources may further include more than two time-frequency resources, and any two of these time-frequency resources need to be the same in time domain and nonconsecutive in frequency domain.

Figure 7B:
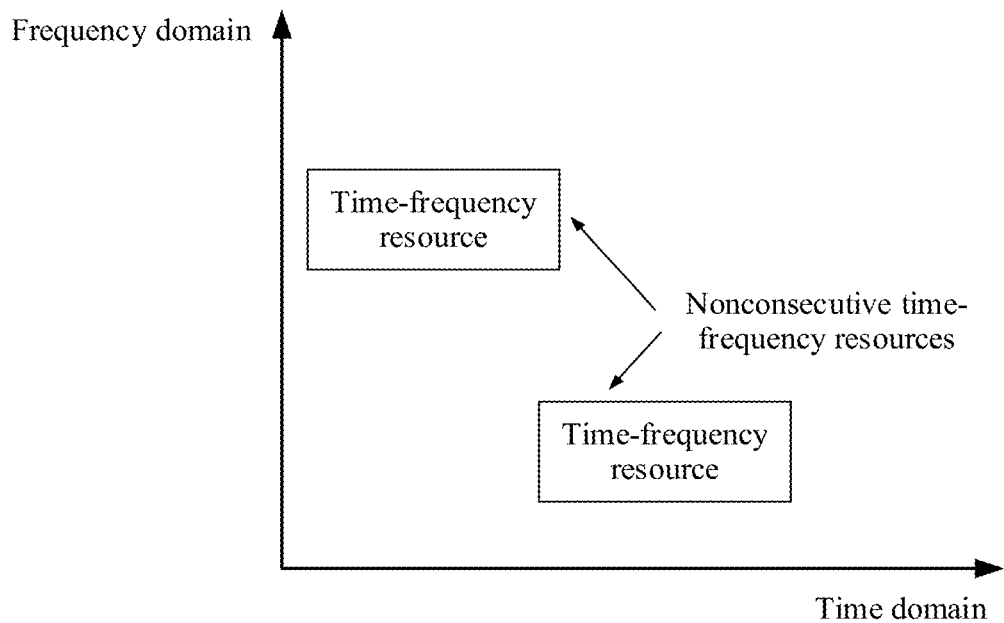
FIG. 7B is another schematic diagram of nonconsecutive time-frequency resources according to an embodiment of this application.

In an embodiment, nonconsecutive time-frequency resources are time-frequency resources that are consecutive in time domain and nonconsecutive in frequency domain. In an embodiment, refer to a schematic diagram of the nonconsecutive time-frequency resources shown in FIG. 7B. In FIG. 7B, two time-frequency resources are used as an example for description. In actual application, the nonconsecutive time-frequency resources may further include more than two time-frequency resources, and any two of these time-frequency resources need to be consecutive in time domain and nonconsecutive in frequency domain.

Figure 7C:
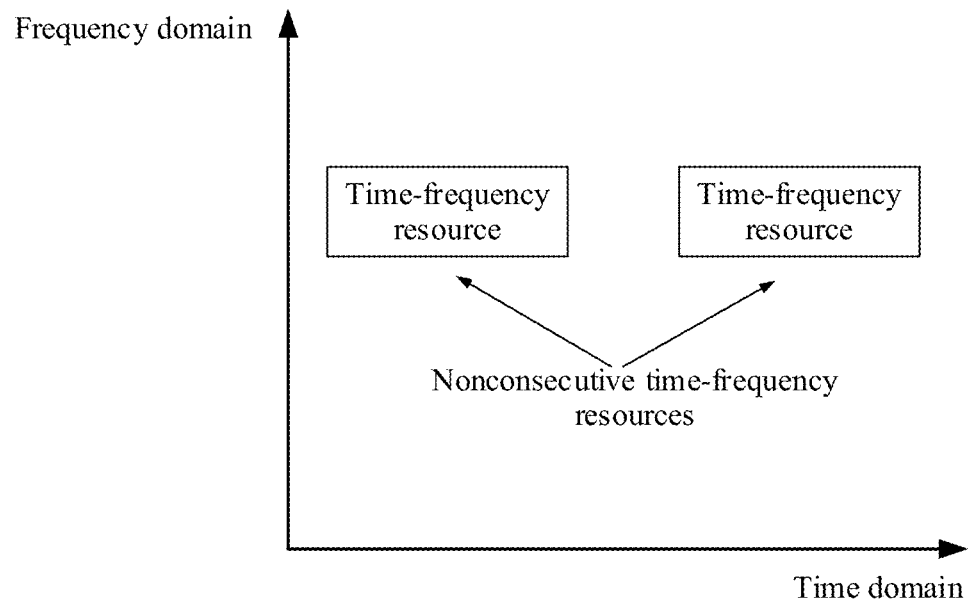
FIG. 7C is another schematic diagram of nonconsecutive time-frequency resources according to an embodiment of this application.

In an embodiment, nonconsecutive time-frequency resources are time-frequency resources that are the same in frequency domain and nonconsecutive in time domain. In an embodiment, refer to a schematic diagram of the nonconsecutive time-frequency resources shown in FIG. 7C. In FIG. 7C, two time-frequency resources are used as an example for description. In actual application, the nonconsecutive time-frequency resources may further include more than two time-frequency resources, and any two of these time-frequency resources need to be the same in frequency domain and nonconsecutive in time domain.

Figure 7D:
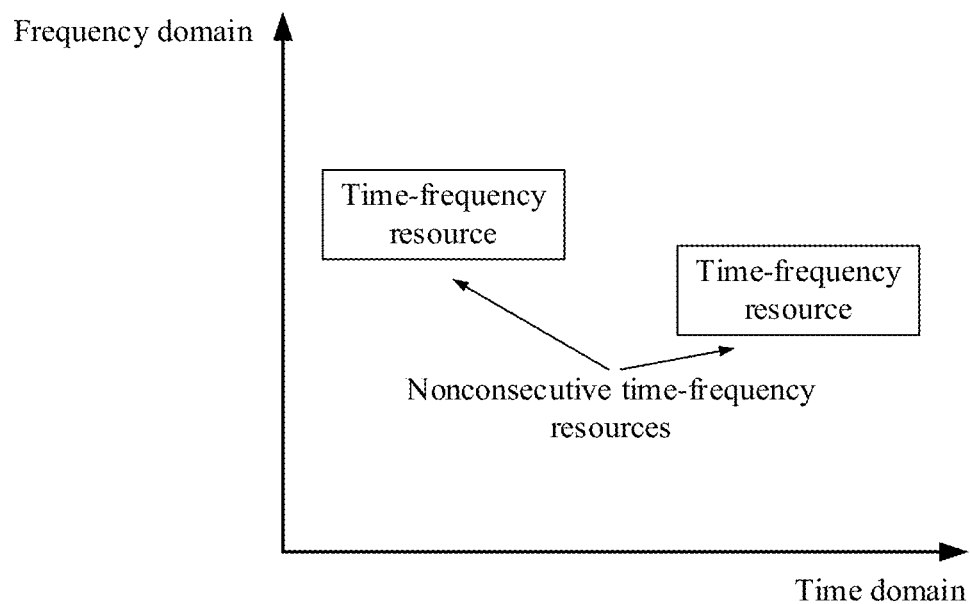
FIG. 7D is another schematic diagram of nonconsecutive time-frequency resources according to an embodiment of this application.

In an embodiment, nonconsecutive time-frequency resources are time-frequency resources that are consecutive in frequency domain and nonconsecutive in time domain. In an embodiment, refer to a schematic diagram of the nonconsecutive time-frequency resources shown in FIG. 7D. In FIG. 7D, two time-frequency resources are used as an example for description. In actual application, the nonconsecutive time-frequency resources may further include more than two time-frequency resources, and any two of these time-frequency resources need to be consecutive in frequency domain and nonconsecutive in time domain.

Figure 7E:
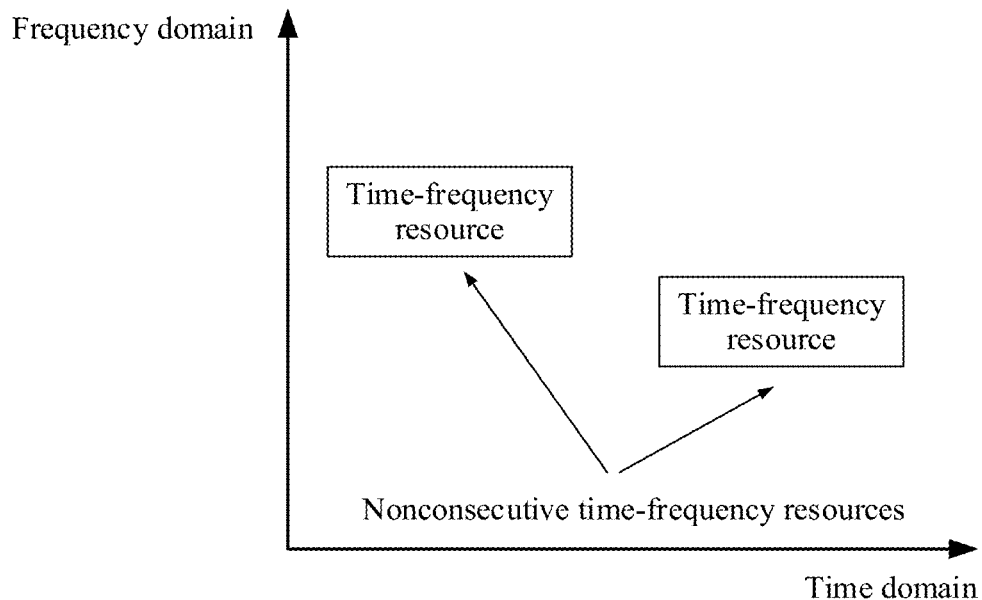
FIG. 7E is another schematic diagram of nonconsecutive time-frequency resources according to an embodiment of this application.

In an embodiment, nonconsecutive time-frequency resources are time-frequency resources that are nonconsecutive in time domain and also nonconsecutive in frequency domain. In an embodiment, refer to a schematic diagram of the nonconsecutive time-frequency resources shown in FIG. 7E. In FIG. 7E, two time-frequency resources are used as an example for description. In actual application, the nonconsecutive time-frequency resources may further include more than two time-frequency resources, and any two of these time-frequency resources need to be nonconsecutive in time domain and also nonconsecutive in frequency domain.

Figure 7F:
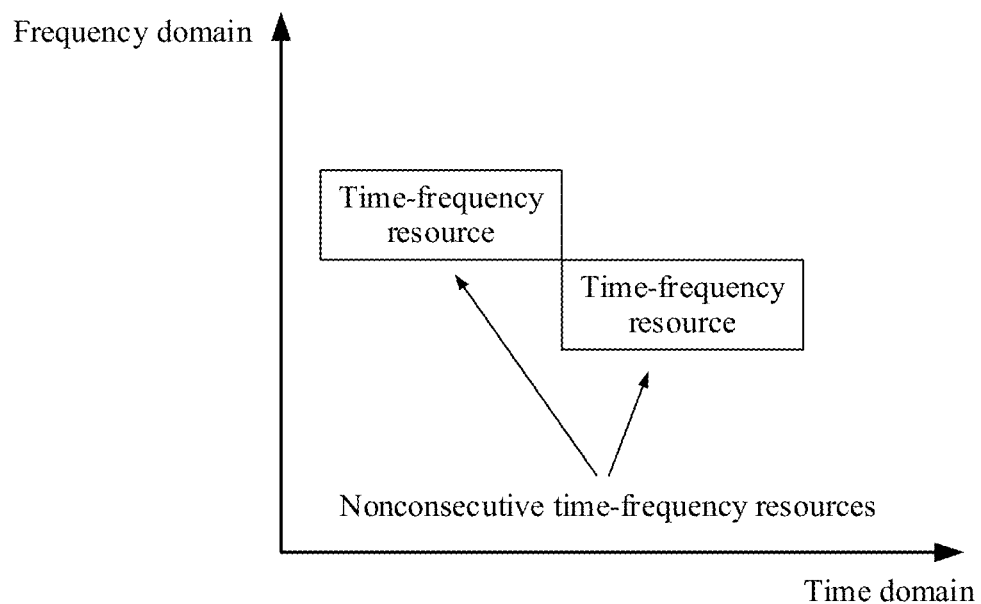
FIG. 7F is another schematic diagram of nonconsecutive time-frequency resources according to an embodiment of this application.

In a special case, nonconsecutive time-frequency resources are time-frequency resources that are consecutive in time domain and also consecutive in frequency domain. In an embodiment, refer to a schematic diagram of the nonconsecutive time-frequency resources shown in FIG. 7F. In this case, in two adjacent time-frequency resources, a time domain ending position of one time-frequency resource is a time domain starting position of the other time-frequency resource, and a frequency domain ending position of one time-frequency resource is a frequency domain starting position of the other time-frequency resource. In FIG. 7F, two time-frequency resources are used as an example for description. In actual application, the nonconsecutive time-frequency resources may further include more than two time-frequency resources, and any two adjacent time-frequency resources of these time-frequency resources need to be consecutive in time domain and also consecutive in frequency domain shown in FIG. 7F.

That the time-frequency resources are the same in time domain may also be understood as that time domain positions of the time-frequency resources are the same. That the time-frequency resources are the same in frequency domain may also be understood as that frequency domain positions of the time-frequency resources are the same. The time domain position may be a position of a time domain resource such as a subframe, a slot, a mini-slot, or a symbol. The frequency domain position may be a position of a frequency domain resource such as a subcarrier, a resource block (RB), or a subchannel.

In this embodiment of this application, that the time-frequency resources are consecutive in time domain means that in any two time-frequency resources, a time domain ending position of one time-frequency resource is a time domain starting position of the other time-frequency resource. Time domain continuity may also be referred to as time domain adjacency, time continuity, or time adjacency. That the time-frequency resources are consecutive in frequency domain means that in any two time-frequency resources, a frequency domain ending position of one time-frequency resource is a frequency domain starting position of the other time-frequency resource. Frequency domain continuity may also be referred to as frequency domain adjacency, frequency continuity, or frequency adjacency.

It should be further noted that the time-frequency resources that are nonconsecutive in frequency domain are included in time-frequency resources that are nonconsecutive in a same frequency band, a same carrier, or a same bandwidth part (BWP). The time-frequency resources that are nonconsecutive in frequency domain may also be included in time-frequency resources in different frequency bands, different carriers, or different bandwidth parts.

In this embodiment of this application, the time domain starting position may be a starting position of a time domain resource such as a subframe, a slot, a mini-slot, or a symbol. The time domain ending position may be an ending position of a time domain resource such as a subframe, a slot, a mini-slot, or a symbol. The frequency domain starting position may be a starting position of a frequency domain resource such as a subcarrier, a resource block, or a subchannel. The frequency domain ending position may be an ending position of a frequency domain resource such as a subcarrier, a resource block, or a subchannel.

In this embodiment of this application, data packet transmission is performed by using the nonconsecutive time-frequency resources, so that a data transmission delay can be reduced, an advantage of timely data packet transmission can be achieved, and utilization of the nonconsecutive time-frequency resources can be improved.

Figure 8:
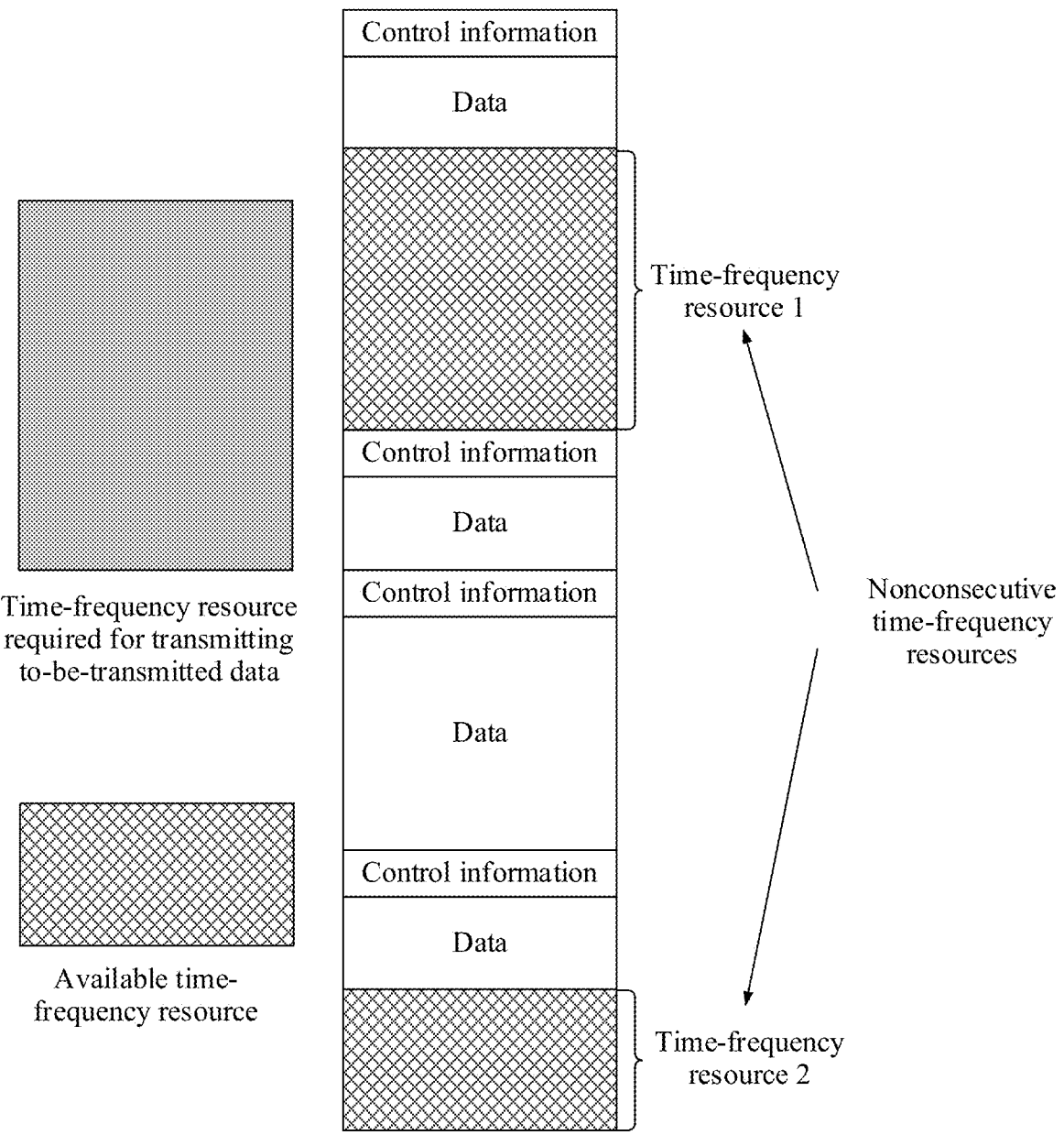
FIG. 8 is a schematic diagram of a nonconsecutive time-frequency resource allocation manner according to an embodiment of this application.

For example, FIG. 8 is a schematic diagram of a nonconsecutive time-frequency resource allocation manner according to an embodiment of this application. In FIG. 8, a time-frequency resource 1 and a time-frequency resource 2 are available time-frequency resources, that is, unoccupied time-frequency resources. The time-frequency resource 1 and the time-frequency resource 2 are nonconsecutive time-frequency resources. Both the two time-frequency resources are smaller than a time-frequency resource required for transmitting to-be-transmitted data, but a sum of the two time-frequency resources is greater than the time-frequency resource required for transmitting the to-be-transmitted data. In this embodiment of this application, the two nonconsecutive time-frequency resources are used together to transmit the to-be-transmitted data. Compared with a consecutive time-frequency resource allocation manner in the prior art, this avoids a case in which the first communications device needs to continuously wait until there are sufficient consecutive available transmission resources to perform data transmission because consecutive available transmission resources are insufficient. In this embodiment of this application, a data transmission delay can be reduced, an advantage of timely data packet transmission can be achieved, and utilization of the nonconsecutive time-frequency resources can be improved.

In this embodiment of this application, sizes of different time-frequency resources may be the same or may be different. This is not limited in this application. One time-frequency resource includes one or more time-frequency units. Herein, the time-frequency unit may be but is not limited to a subchannel.

One subchannel may include one or more time-frequency resource blocks (RB). For example, in a downlink (DL) and an uplink (UL) of LTE, for a configuration scenario of a normal cyclic prefix (CP) length and an extended CP length at a 15 KHz subcarrier spacing, one time-frequency resource block includes 12 consecutive subcarriers in frequency domain and 6 (extended CP length) and 7 (normal CP length) orthogonal frequency division multiplexing (OFDM) symbols in time domain. In NR, one time-frequency resource block includes 12 consecutive subcarriers in frequency domain.

It should be noted that the example is merely used for explanation and should not constitute a limitation.

It should be noted that the resource in this application is a time-frequency resource, including a time domain resource and a frequency domain resource. Generally, the resource is represented as a resource element (RE), a resource block (RB), a subchannel, a symbol, a mini-slot, a slot, a subframe, a subcarrier, a bandwidth, a transmission time interval (TTI), and the like. For definitions of the resource element, the resource block, and other concepts, refer to, without limitation, to LTE and NR standards, and definitions of various resource forms in future communications standards may be different.

It should be noted that control information in this embodiment of this application may be sidelink scheduling allocation information SA.

It should be noted that the control information may indicate at least one of a time domain starting position, a time domain length, a time domain ending position, a frequency domain starting position, a frequency domain length, and a frequency domain ending position for data transmission. For example, the control information may indicate the time domain starting position, the time domain length, the frequency domain starting position, and the frequency domain length for data transmission.

In this application, the available time-frequency resource and an idle time-frequency resource have a same meaning, and both refer to a time-frequency resource that is not reserved and occupied. For example, an available subchannel is equivalent to an idle subchannel.

Figure 9:
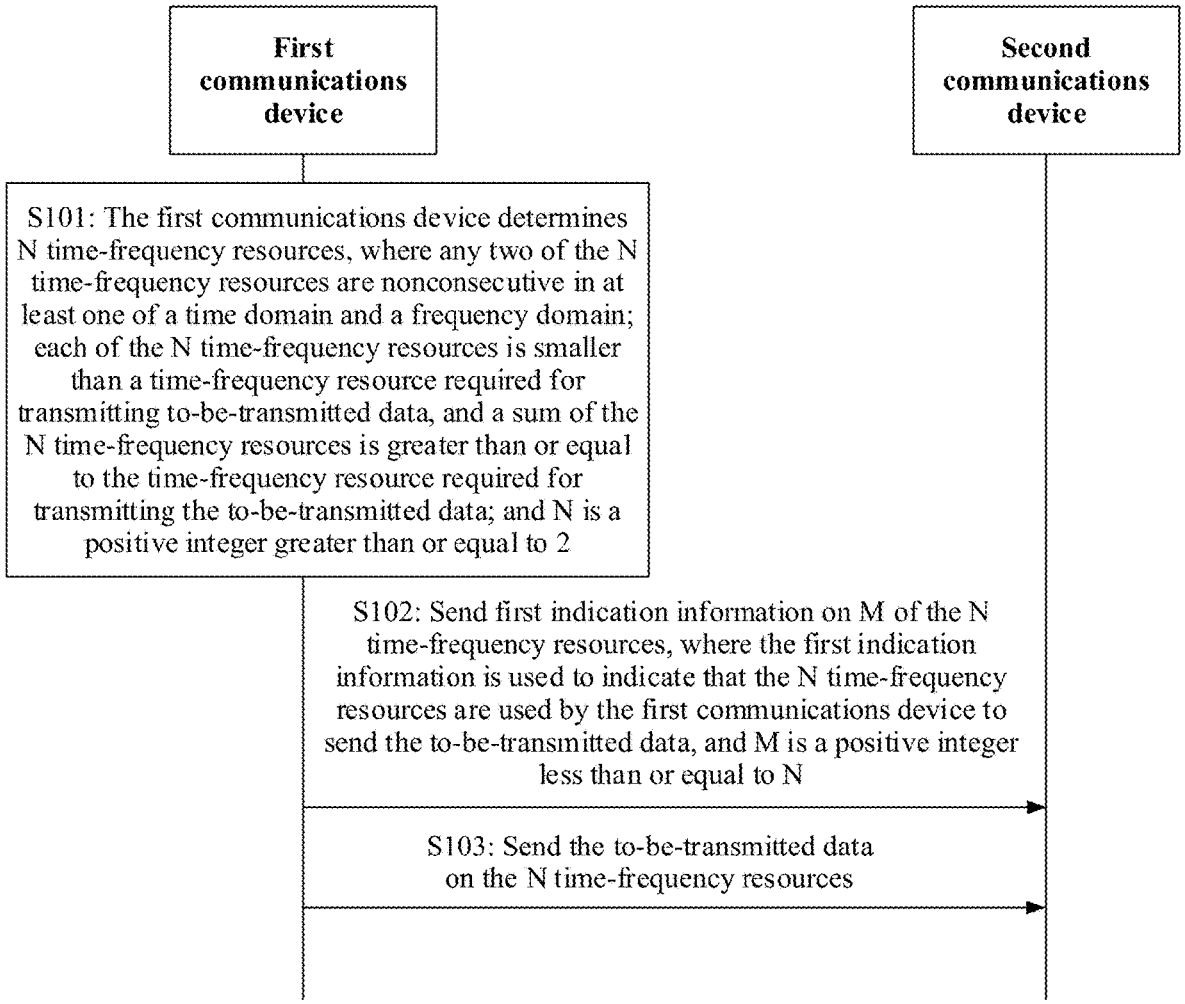
FIG. 9 is a schematic flowchart of a data transmission method according to an embodiment of this application.

Based on the foregoing main inventive principle, the following describes an overall procedure of the data transmission method provided in this application. FIG. 9 shows a procedure of a data transmission method according one embodiment to this application.

As shown in FIG. 9, the data transmission method according to this application includes but is not limited to operations S101 to S103. The following describes each operation in detail.

S101: A first communications device determines N time-frequency resources, where any two of the N time-frequency resources are nonconsecutive in at least one of a time domain and a frequency domain; each of the N time-frequency resources is smaller than a time-frequency resource required for transmitting to-be-transmitted data, and a sum of the N time-frequency resources is greater than or equal to the time-frequency resource required for transmitting the to-be-transmitted data; and N is a positive integer greater than or equal to 2.

In an embodiment, any two of the N time-frequency resources are the same in time domain but are nonconsecutive in frequency domain. For details, refer to the nonconsecutive time-frequency resources shown in FIG. 7A. Details are not described herein again.

In another embodiment, any two of the N time-frequency resources are consecutive in time domain and are nonconsecutive in frequency domain. For details, refer to the nonconsecutive time-frequency resources shown in FIG. 7B. Details are not described herein again.

In another embodiment, any two of the N time-frequency resources are the same in frequency domain and are nonconsecutive in time domain. For details, refer to the nonconsecutive time-frequency resources shown in FIG. 7C. Details are not described herein again.

In another embodiment, any two of the N time-frequency resources are consecutive in frequency domain and are nonconsecutive in time domain. For details, refer to the nonconsecutive time-frequency resources shown in FIG. 7D. Details are not described herein again.

In another embodiment, any two of the N time-frequency resources are nonconsecutive in time domain and are also nonconsecutive in frequency domain. For details, refer to the nonconsecutive time-frequency resources shown in FIG. 7E. Details are not described herein again.

In a special case, any two of the N time-frequency resources are consecutive in time domain and are also consecutive in frequency domain. For details, refer to the nonconsecutive time-frequency resources shown in FIG. 7F. Details are not described herein again.

For definitions of time domain continuity and frequency domain continuity, refer to the foregoing embodiments. Details are not described herein again.

Sizes of any two of the N time-frequency resources may be the same or may be different. This is not limited in this application.

Each of the N time-frequency resources includes one or more time-frequency units, and the time-frequency unit may be a subchannel.

It should be noted that the N time-frequency resources are all available time-frequency resources or idle time-frequency resources, that is, time-frequency resources that are not occupied by another communications device.

S102: The first communications device sends first indication information on M of the N time-frequency resources, and a second communications device receives the first indication information on M of the N time-frequency resources, where the first indication information is used to indicate that the N time-frequency resources are used by the first communications device to send the to-be-transmitted data, and M is a positive integer less than or equal to N.

Optionally, a manner in which the first communications device sends the first indication information on M of the N time-frequency resources may be: sending SA on M of the N time-frequency resources, where the SA carries the first indication information. Correspondingly, the second communications device receives the SA on M of the N time-frequency resources, and parses the SA to obtain the first indication information.

Optionally, the first communications device may further use other newly defined control information to carry the first indication information. This is not limited in this application.

In this embodiment of this application, the first indication information includes but is not limited to the following three implementations.

(1) In a first implementation, the first indication information includes P bits corresponding to P time-frequency units; each bit is used to indicate whether one time-frequency unit is used by the first communications device to send the to-be-transmitted data; the P bits are used to indicate that a time-frequency unit that is included in the N time-frequency resources and that is in the P time-frequency units is used by the first communications device to send the to-be-transmitted data, and a time-frequency unit, other than the time-frequency unit included in the N time-frequency resources, in the P time-frequency units is not used by the first communications device to send the to-be-transmitted data; and P is a positive integer greater than or equal to N. Herein, a character string including the P bits may be referred to as a bitmap.

The time-frequency unit may be but is not limited to a subchannel. For example, the time-frequency unit is a subchannel. For a V2X communications system, P subchannels may be all subchannels included in a communication resource pool used for V2X communication, and P is a total quantity of subchannels included in the communication resource pool. For a V2P communications system, P subchannels may be all subchannels included in a communication resource pool used for V2P communication, and P is a total quantity of subchannels included in the communication resource pool. For a V2I communications system, P subchannels may be all subchannels included in a communication resource pool used for V2I communication, and P is a total quantity of subchannels included in the communication resource pool. For a D2D communications system, P subchannels may be all subchannels included in a communication resource pool used for D2D communication, and P is a total quantity of subchannels included in the communication resource pool.

Figure 10A:
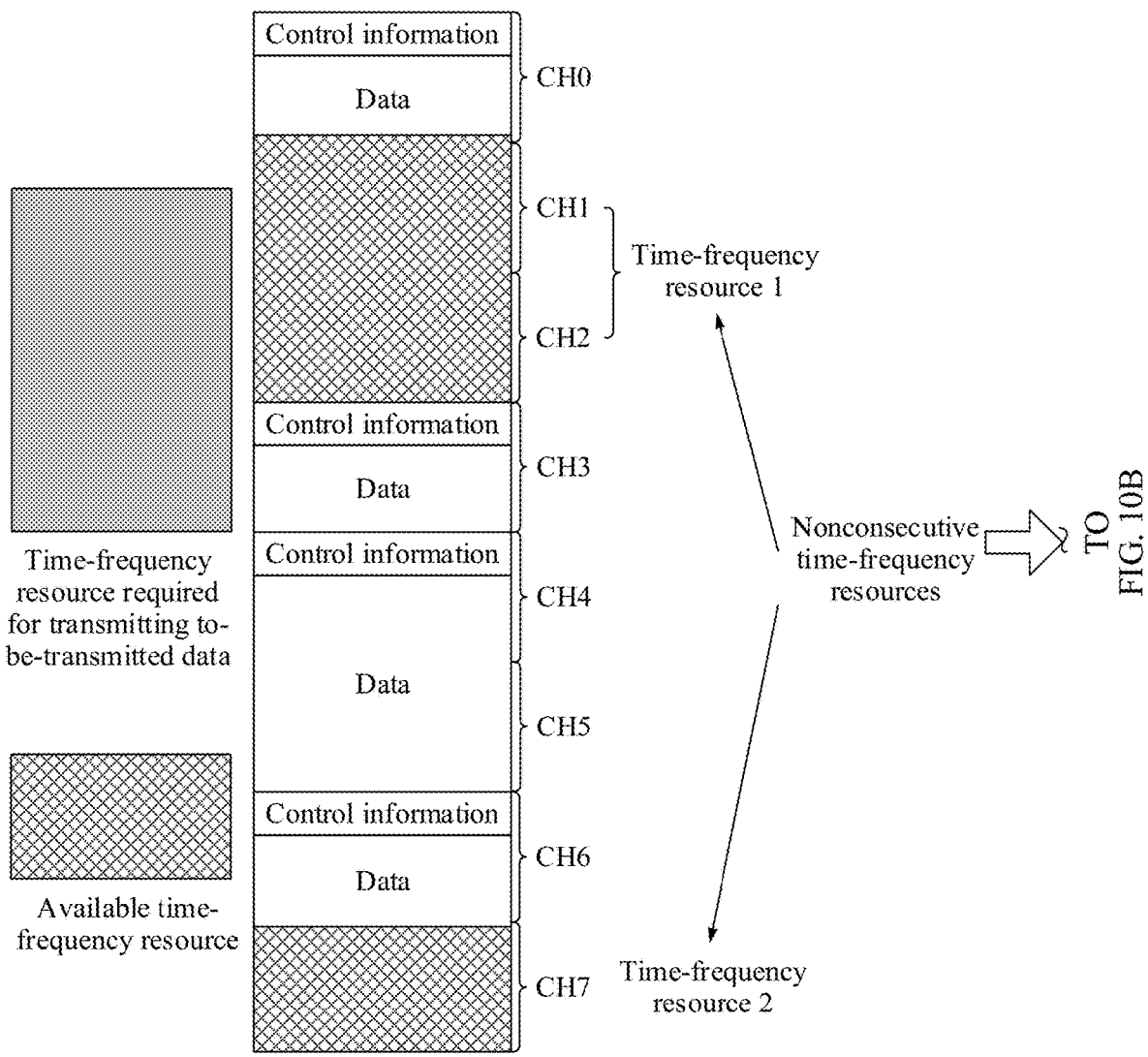
FIG. 10A and FIG. 10B are a schematic diagram of transmitting data by using nonconsecutive time-frequency resources according to an embodiment of this application.
Figure 10B:
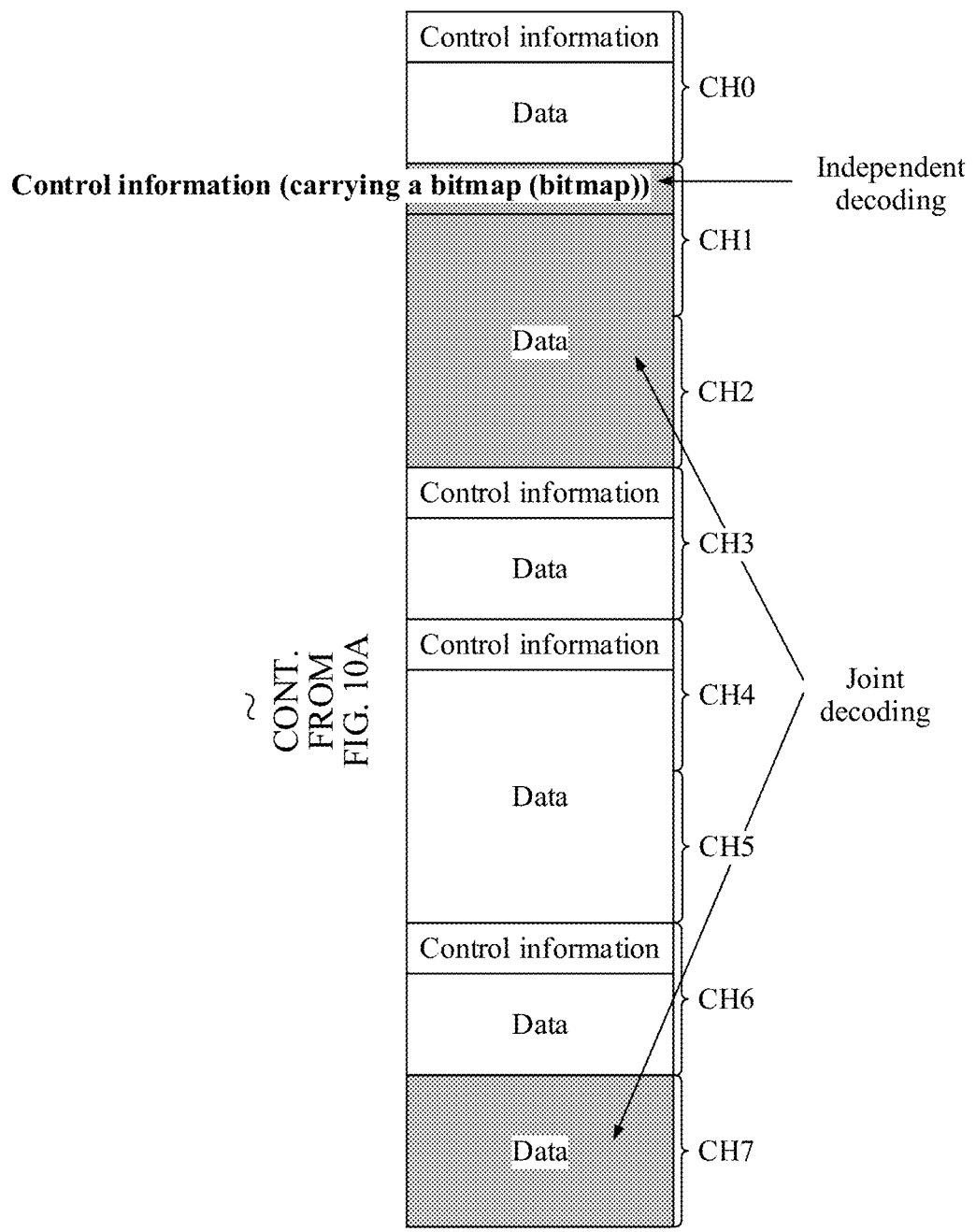

In this implementation, the bitmap is used to indicate transmission statuses of all subchannels. Herein, the bitmap includes the foregoing P bits, and each subchannel uses one bit to indicate whether the subchannel is used by the first communications device to send the to-be-transmitted data. For example, FIG. 10A and FIG. 10B are a schematic diagram of transmitting data by using nonconsecutive time-frequency resources. It is assumed that a total quantity P of subchannels included in a communication resource pool is 8, and the eight subchannels are CH0 to CH7. It is assumed that there are two nonconsecutive available time-frequency resources in a subframe/slot, where a time-frequency resource 1 includes two subchannels CH1 and CH2, and a time-frequency resource 2 includes one subchannel CH7. Each available time-frequency resource is insufficient to transmit a current data packet, but a total resource size of the two nonconsecutive available time-frequency resources can support transmission of the current data packet. In this case, the first communications device transmits the current data packet by using the two nonconsecutive available time-frequency resources. In this case, the bitmap bitmap including the P bits may be 01100001, indicating the first communications device to select the subchannel 1, the subchannel 2, and the subchannel 7 for transmission. A bit 0 indicates that a subchannel corresponding to the bit is not used by the first communications device to send the to-be-transmitted data. A bit 1 indicates that a subchannel corresponding to the bit is used by the first communications device to send the to-be-transmitted data. Subchannels respectively corresponding to bits in the bitmap may be predefined in a communication protocol. For example, if subchannels are arranged in a sequence of CH0 to CH1, the first bit in the bitmap corresponds to the first subchannel CH0, and the second bit corresponds to the second subchannel CH1.

Optionally, because all consecutive or nonconsecutive subchannels occupied for data transmission may be indicated by using the bitmap, when transmitting the to-be-transmitted data, the first communications device only needs to send, on one of the N time-frequency resources, SA that carries the bitmap, that is, M=1. In an embodiment, a time-frequency resource used to transmit the SA is not limited. For example, for FIG. 10A and FIG. 10B, the first communications device may send, on the subchannel 1 or the subchannel 2 included in the time-frequency resource 1, the SA that carries the bitmap 01100001. Alternatively, the first communications device may send, on the subchannel 7 included in the time-frequency resource 2, the SA that carries the bitmap 01100001. For example, the first communications device sends, on the subchannel 1, the SA that carries the bitmap 01100001. After receiving the SA on the subchannel 1, the second communications device decodes the SA, to obtain, through parsing, the bitmap included in the SA, and learns of, by identifying the bitmap, subchannels used by the first communications device to jointly transmit one data packet. For example, for FIG. 10A and FIG. 10B, the second communications device identifies, by using the bitmap 01100001, that the first communications device transmits one data packet by using the subchannel 1, the subchannel 2, and the subchannel 7. In this case, the second communications device jointly decodes data carried on the subchannel 1, the subchannel 2, and the subchannel 7. In the first implementation, the second communications device may learn of, by using the bitmap in the SA, information about all consecutive and nonconsecutive subchannels indicated by the bitmap.

It should be noted that all the consecutive and/or nonconsecutive subchannels are indicated by using the bitmap. This manner is applicable to a system in which a frequency domain resource allocated to the V2X communication resource pool is not large and a quantity of subchannels is relatively small.

(2) In a second implementation, the first indication information includes an identifier of the first communications device and an indicator; M is equal to N, and the identifier of the first communications device is used to indicate that the N time-frequency resources are used by the first communications device to send the to-be-transmitted data; and an indicator sent on a last time-frequency resource in the N time-frequency resources is different from an indicator sent on a non-last time-frequency resource in the N time-frequency resources.

The identifier of the communications device may be a preset quantity of last bits of an IP address of a transmit-end communications device, or may be a preset quantity of last bits of a cell radio network temporary identifier (C-RNTI) configured by a network device for the transmit-end communications device, or may be a preset quantity of random numbers randomly generated by the transmit-end communications device, or may be another identifier used to identify a same device.

An indicator may be one bit, and is used to identify a subchannel on which a same transport block is sent subsequently. It should be noted that a transport block is a data unit used for air interface transmission of a data packet after the data packet is processed by using protocols at all layers and transmitted to a physical layer. The indicator sent on the last of the N time-frequency resources needs to be different from an indicator sent on another time-frequency resource. For example, on the N time-frequency resources, an indicator in SA sent on a time-frequency resource 1 is 1, an indicator in SA sent on a time-frequency resource 2 is 0, and the indicator 0 indicates a last time-frequency resource for transmitting a same transport block.

Different from FIG. 10A and FIG. 10B in which an SA indication needs to be sent on only one time-frequency resource for transmission of one data packet, in the second implementation, when transmitting each piece of data, the first communications device needs to transmit, on each of the N time-frequency resources, SA that carries the identifier of the first communications device and the indicator.

Figure 11A:
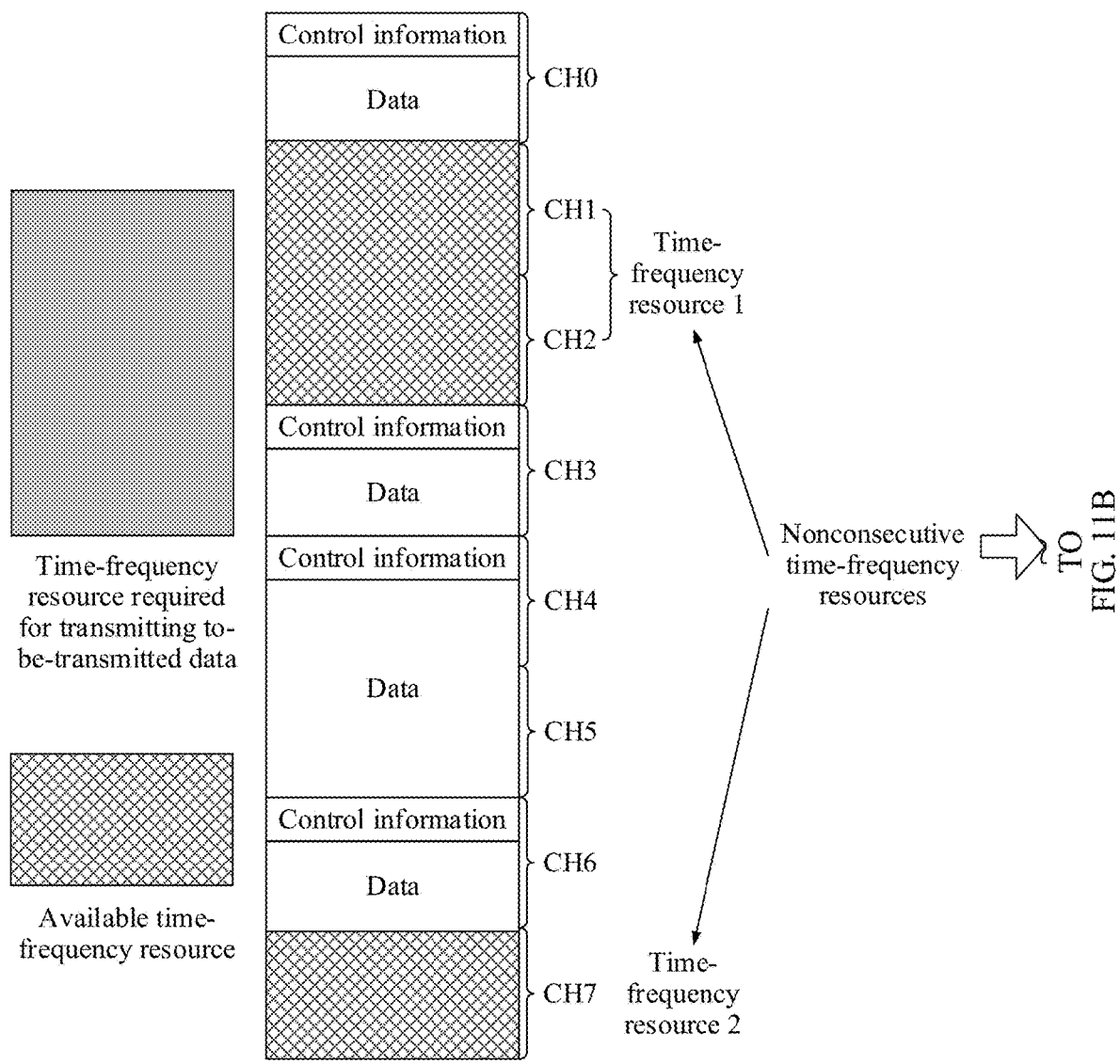
FIG. 11A and FIG. 11B are another schematic diagram of transmitting data by using nonconsecutive time-frequency resources according to an embodiment of this application.
Figure 11B:
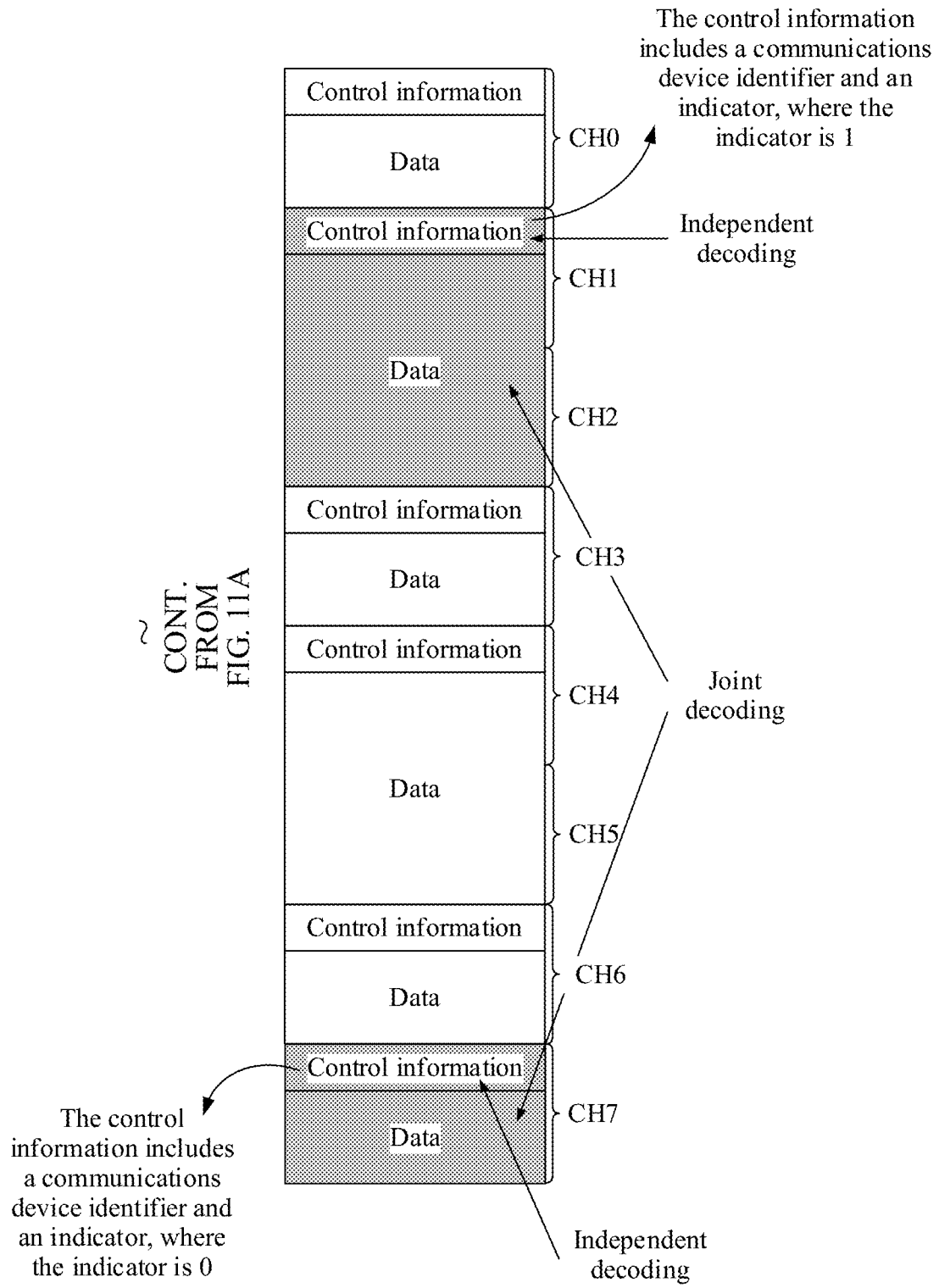

After receiving the SA on the time-frequency resource 1 and the time-frequency resource 2, the second communications device decodes the SA, to obtain, through parsing, the identifier of the communications device and the indicator that are included in the SA. It can be learned, by identifying the identifier of the communications device, that data carried on the time-frequency resource 1 and the time-frequency resource 2 is data sent by a same communications device, and a last time-frequency resource carrying the data is determined through the identification indicator. For example, for FIG. 11A and FIG. 11B, an identifier of a communications device included in SA sent on the time-frequency resource 1 is UE 1, and an indicator is 1; and an identifier of a communications device included in SA sent on the time-frequency resource 2 is UE 1, and an indicator is 0. Assuming that the UE 1 is the identifier of the first communications device, the second communications device may determine that the first communications device transmits one data packet by using both the time-frequency resource 1 and the time-frequency resource 2. In this case, the second communications device jointly decodes data carried on the time-frequency resource 1 and the time-frequency resource 2. In the second implementation, after obtaining, through parsing, an indicator that is 1, the second communications device continues to search for SA on remaining subchannels, until parsing SA that has an identifier of the first communications device and an indicator that is 0. Therefore, the second communications device may learn of information about all consecutive and nonconsecutive subchannels used by the first communications device to transmit data.

(3) In a third implementation, the first indication information includes N pieces of time-frequency resource indication information; and each piece of time-frequency resource indication information indicates at least one of a time domain starting position, a time domain ending position, a time domain length, a frequency domain starting position, a frequency domain ending position, and a frequency domain length of a time-frequency resource.

For example, assuming that N is equal to 2, the N time-frequency resources include a time-frequency resource 1 and a time-frequency resource 2, and the N pieces of time-frequency resource indication information include two pieces of time-frequency resource indication information. One of the two pieces of time-frequency resource indication information is used to indicate a time domain starting position, a time domain ending position, a frequency domain starting position, and a frequency domain ending position of the time-frequency resource 1. The another piece of time-frequency resource indication information is used to indicate a time domain starting position, a time domain ending position, a frequency domain starting position, and a frequency domain ending position of the time-frequency resource 2. Alternatively, one of the two pieces of time-frequency resource indication information is used to indicate a time domain starting position, a time domain length, a frequency domain starting position, and a frequency domain length of the time-frequency resource 1. The another piece of time-frequency resource indication information is used to indicate a time domain starting position, a time domain length, a frequency domain starting position, and a frequency domain length of the time-frequency resource 2.

In this embodiment of this application, the time domain starting position may be a starting position of a time domain resource such as a subframe, a slot, a mini-slot, or a symbol. The time domain ending position may be an ending position of a time domain resource such as a subframe, a slot, a mini-slot, or a symbol. The frequency domain starting position may be a starting position of a frequency domain resource such as a subcarrier, a resource block (RB), or a subchannel. The frequency domain ending position may be an ending position of a frequency domain resource such as a subcarrier, or a subchannel. The time domain length may be consecutive symbols, mini-slots, slots, subframes, or frames in time domain, and the frequency domain length may be consecutive subcarriers, resource blocks, or subchannels in frequency domain.

Figure 12A:
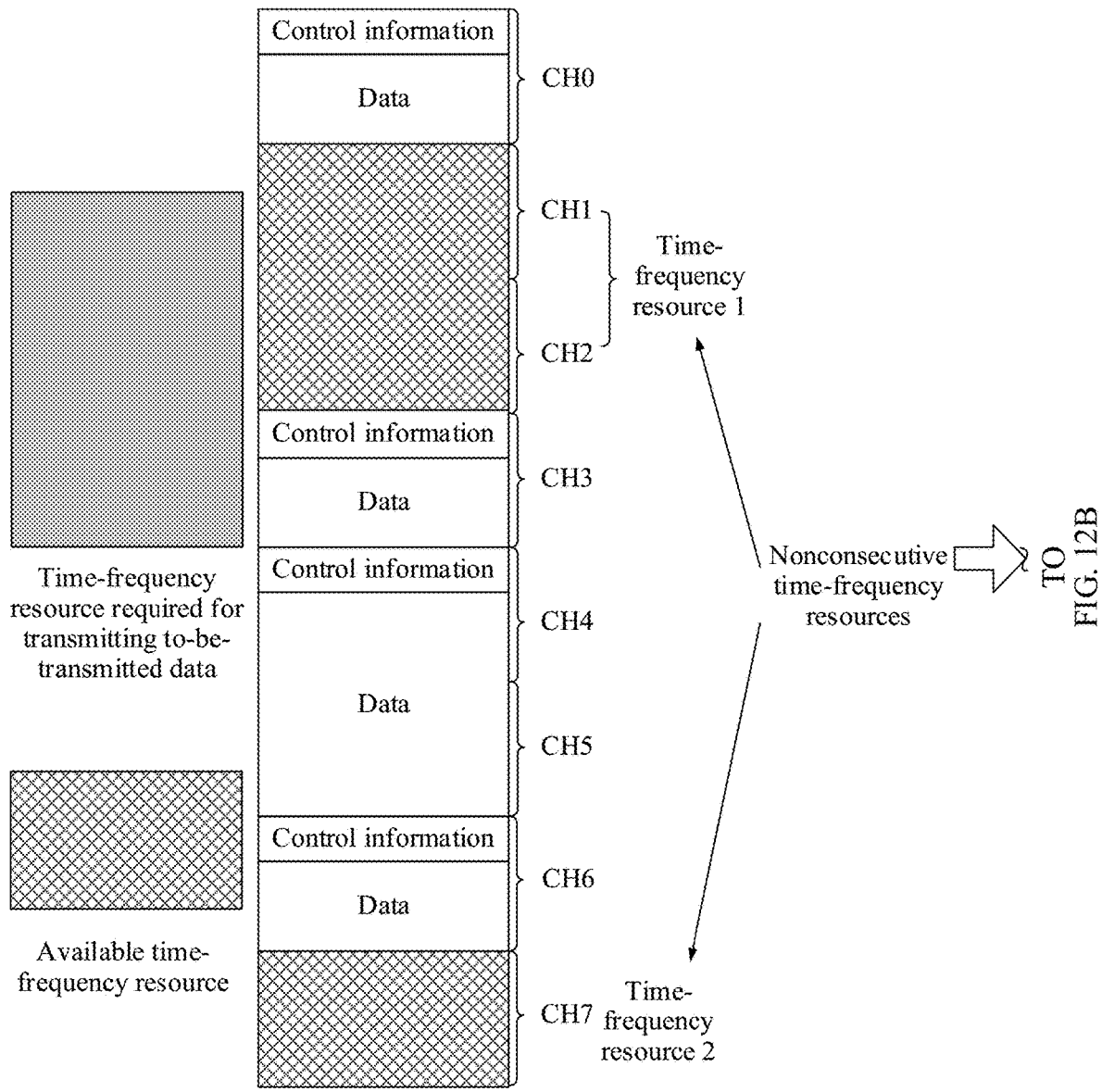
FIG. 12A and FIG. 12B are another schematic diagram of transmitting data by using nonconsecutive time-frequency resources according to an embodiment of this application.
Figure 12B:
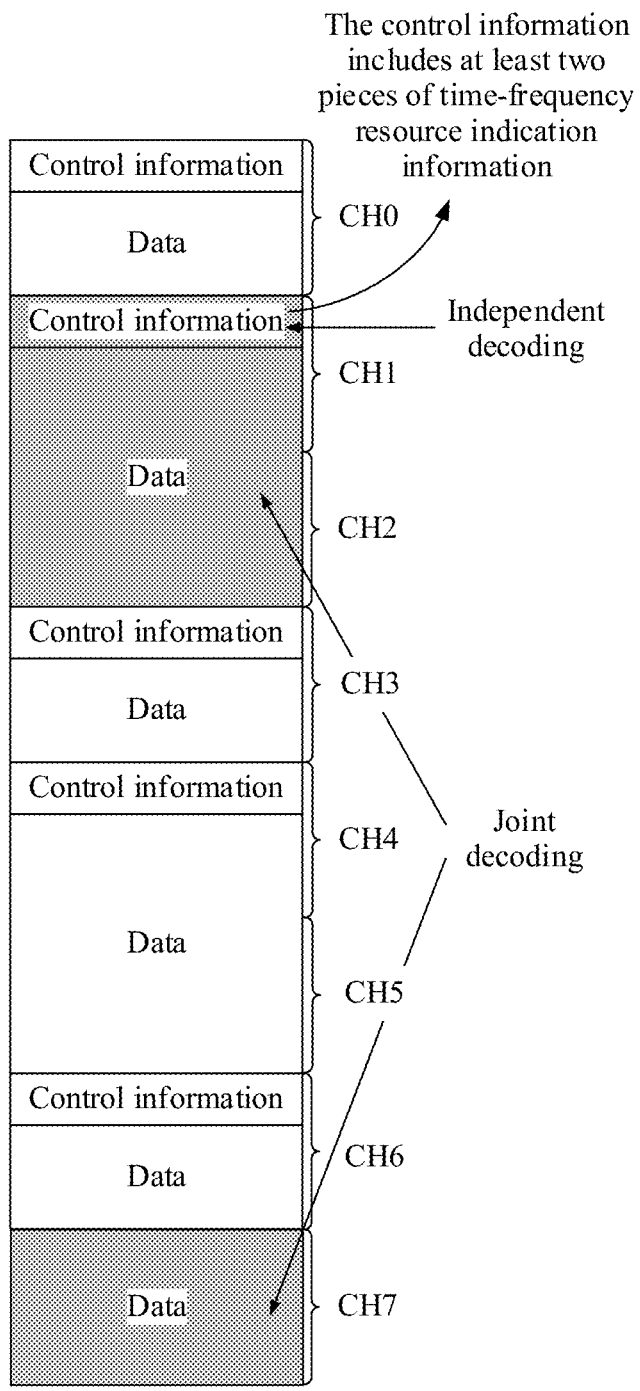

Optionally, because the third implementation may indicate positions of all nonconsecutive time-frequency resources occupied for data transmission, when transmitting the to-be-transmitted data, the first communications device only needs to send, on one of the N time-frequency resources, SA that carries the N pieces of time-frequency resource indication information, that is, M=1. In an embodiment, a time-frequency resource used to transmit the SA is not limited. For example, for FIG. 12A and FIG. 12B, the first communications device may send, on the subchannel 1 or the subchannel 2 included in the time-frequency resource 1, the SA that carries the N pieces of time-frequency resource indication information. Alternatively, the first communications device may send, on the subchannel 7 included in the time-frequency resource 2, the SA that carries the N pieces of time-frequency resource indication information.

For example, the first communications device sends, on the time-frequency resource 1, the SA that carries the N pieces of time-frequency resource indication information. After receiving the SA on the time-frequency resource 1, the second communications device decodes the SA, to obtain, through parsing, the N pieces of time-frequency resource indication information included in the SA, and learns of, through the N pieces of time-frequency resource indication information, time-frequency resources used by the first communications device to jointly transmit one data packet. For example, for FIG. 12A and FIG. 12B, the second communications device identifies, by using the N pieces of time-frequency resource indication information, that the first communications device transmits one data packet by using the time-frequency resource 1 and the time-frequency resource 2. In this case, the second communications device jointly decodes the data carried on the time-frequency resource 1 and the time-frequency resource 2. In the third implementation, the second communications device may learn of, by using the N pieces of time-frequency resource indication information in the SA, information about all consecutive and nonconsecutive subchannels indicated by the N pieces of time-frequency resource indication information.

It should be noted that this embodiment is described by using two available time-frequency resources as an example. In actual application, a quantity of available time-frequency resources included in nonconsecutive time-frequency resources used to transmit a data packet is not limited to 2. In addition, this embodiment is described by using an example in which the two available time-frequency resources separately include two subchannels and one subchannel. In actual application, quantities of subchannels separately included in the available time-frequency resources may be the same or may be different.

It should be further noted that, when time-frequency resources that are nonconsecutive in frequency domain are located in different frequency bands, different carriers, or different bandwidth parts, the time-frequency resource indication information further needs to indicate different frequency bands, different carriers, or different bandwidth parts.

S103: The first communications device sends the to-be-transmitted data on the N time-frequency resources, and the second communications device receives the to-be-transmitted data on the N time-frequency resources.

In this embodiment of this application, after determining the N time-frequency resources, the first communications device transmits the to-be-transmitted data by using the N time-frequency resources, and the second communications device receives the to-be-transmitted data on the N time-frequency resources. FIG. 10A and FIG. 10B are used as an example. If the N time-frequency resources determined by the first communications device include a time-frequency resource 1 and a time-frequency resource 2, to-be-transmitted data is encoded, and time-frequency resource mapping is performed on the encoded data in a frequency domain number and time domain number sequence, and the encoded data is sent. Herein, the frequency domain number and time domain number sequence may be defined in a communication protocol. The second communications device learns of, according to the first indication information in operation S102, the nonconsecutive time-frequency resources used by the first communications device to transmit data, so as to perform joint decoding on data carried on the nonconsecutive time-frequency resources, and finally obtain data sent by the first communications device.

According to the data transmission method shown in FIG. 9, when consecutive available time-frequency resources are insufficient for transmitting one data packet, and nonconsecutive available time-frequency resources are greater than or equal to a size of a time-frequency resource required for transmitting one data packet, the first communications device performs data transmission by using the nonconsecutive time-frequency resources, and notifies, by using the first indication information, the second communications device of the nonconsecutive time-frequency resources used for data transmission. The second communications device learns of, based on the first indication information, the nonconsecutive time-frequency resources used by the first communications device for data transmission, and further receives the data sent by the first communications device from the nonconsecutive time-frequency resources. According to this application, a data transmission delay is reduced, and utilization of the nonconsecutive time-frequency resources is improved.

The following describes in detail a manner of determining, by the first communications device, the N time-frequency resources in operation S101 with reference to two embodiments.

(1) Embodiment 1

This embodiment is mainly for a mode4 transmission mode. In an embodiment, the first communications device autonomously selects, from available time-frequency resources included in a communication resource pool, a time-frequency resource used for communication, and sends control information and data on the selected resource. In this embodiment, the N time-frequency resources are autonomously selected by the first communications device. That the first communications device determines the N time-frequency resources is: selecting, by the first communications device from O time-frequency units, a time-frequency unit included in the N time-frequency resources, where O is a positive integer greater than or equal to N.

The time-frequency unit may be but is not limited to a subchannel. Herein, O subchannels may be all available idle subchannels determined by the first communications device.

Figure 13A:
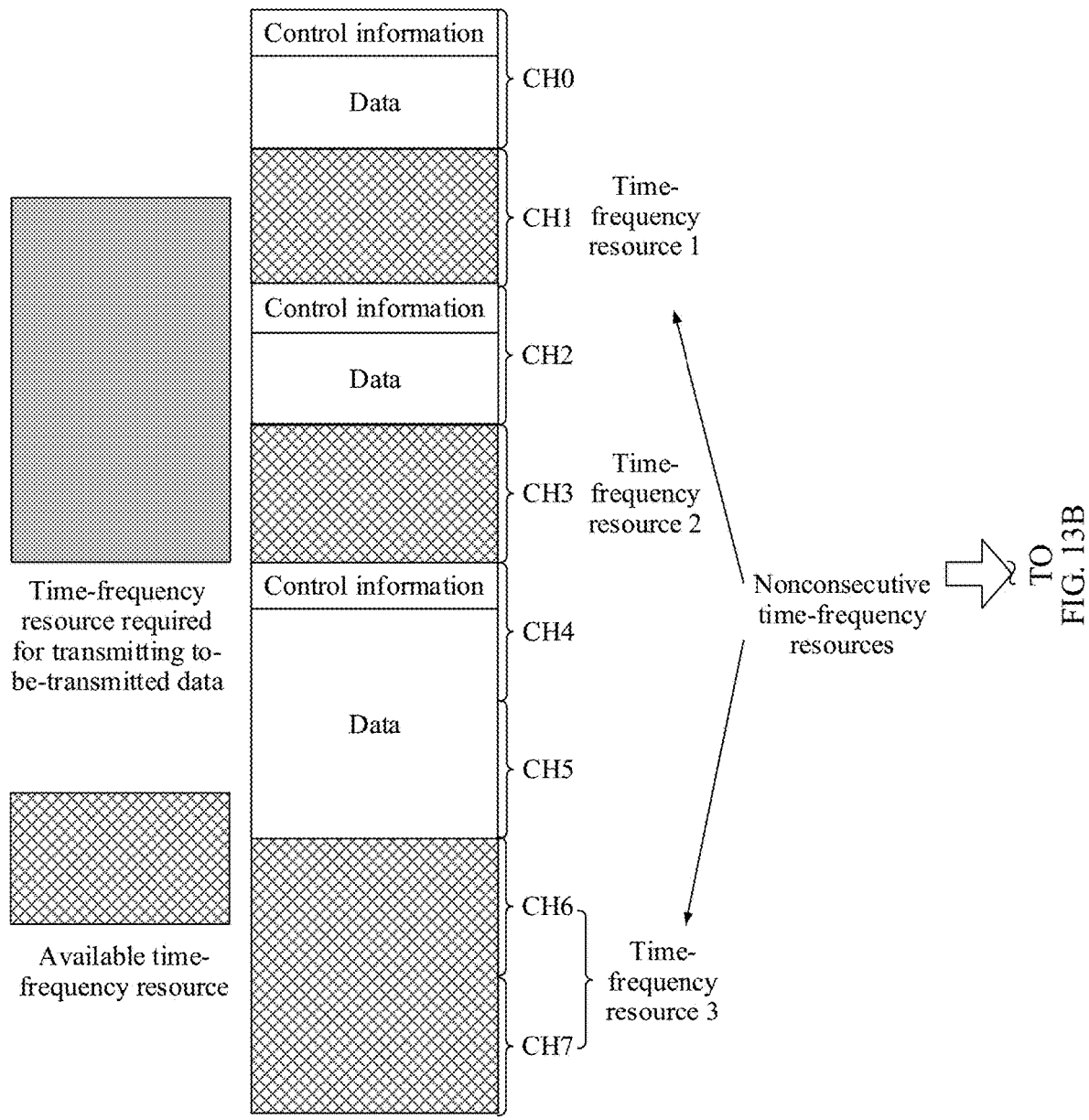
FIG. 13A and FIG. 13B are another schematic diagram of transmitting data by using nonconsecutive time-frequency resources according to an embodiment of this application.
Figure 13B:
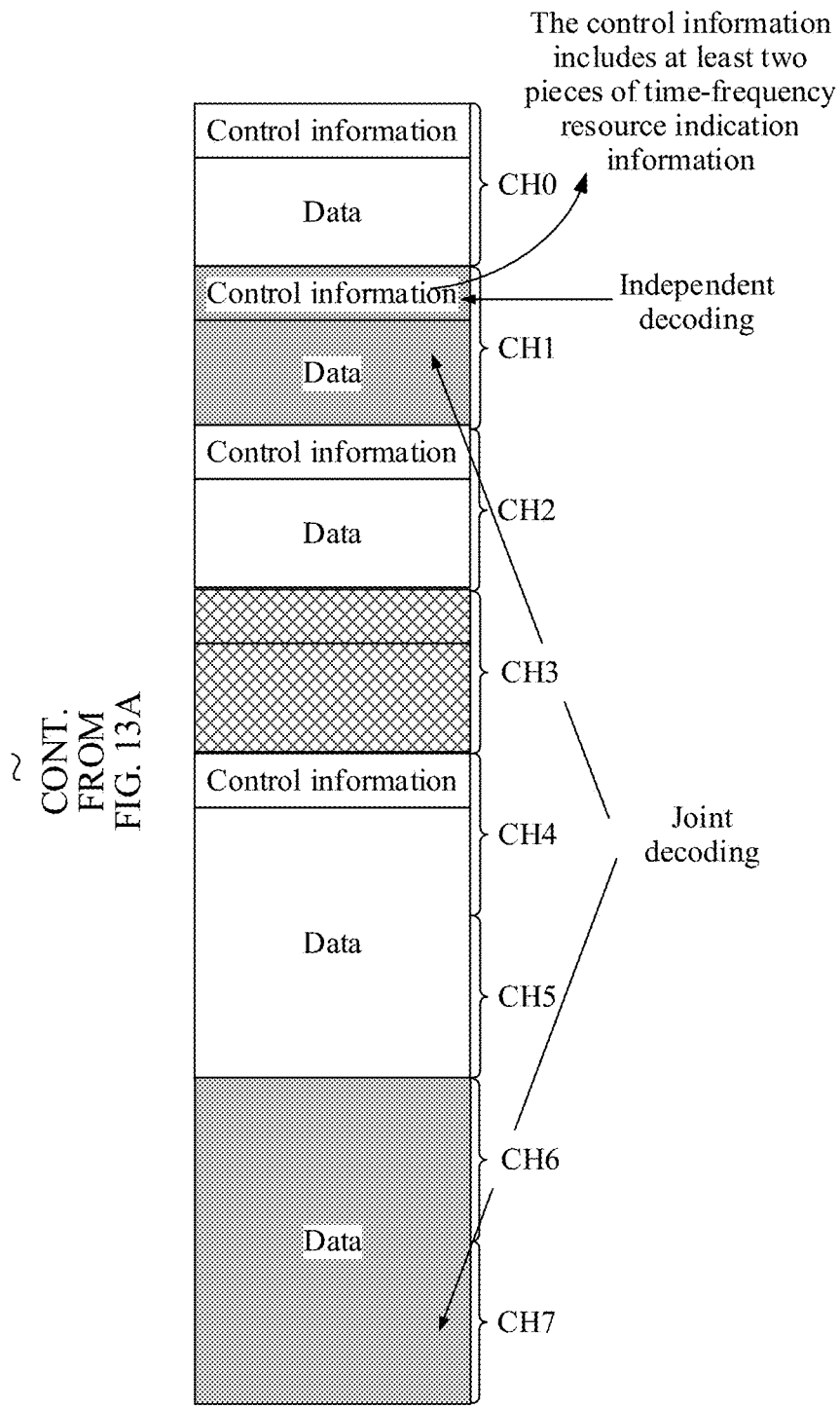

In an embodiment, the first communications device may monitor a time-frequency resource usage and reservation status of another surrounding communications device, to determine available or idle time-frequency resources in all time-frequency resources included in the communication resource pool. When a new data packet arrives at the first communications device, the first communications device is triggered to select a time-frequency resource, for example, the first communications device identifies, whether there is an available time-frequency resource that can be used to transmit the data packet, based on the monitored time-frequency resource usage and reservation status of another communications device. For example, referring to FIG. 13A and FIG. 13B, it is assumed that a total quantity of subchannels included in the communication resource pool is 8, and the eight subchannels are CH0 to CH7. It is assumed that the first communications device detects that there are four available subchannels in a subframe/slot, which are the CH1, the CH3, the CH6, and the CH7, where the CH1 forms an available time-frequency resource 1, the CH3 forms an available time-frequency resource 2, and the CH6 and the CH7 form an available time-frequency resource 3. Each available time-frequency resource is insufficient to transmit a current data packet, but a total resource size of two nonconsecutive available time-frequency resources, including the time-frequency resource 1 and the time-frequency resource 3 or the time-frequency resource 2 and the time-frequency resource 3, can support transmission of the current data packet. In this case, the first communications device determines that the two nonconsecutive available time-frequency resources: the time-frequency resource 1 and the time-frequency resource 3, are used to transmit the current data packet. It should be noted that this embodiment is described by using an example in which two available time-frequency resources transmit a data packet. In actual application, a quantity of available time-frequency resources included in nonconsecutive time-frequency resources used to transmit a data packet is not limited to 2. In addition, this embodiment is described by using an example in which three available time-frequency resources separately include one subchannel, one subchannel, and two subchannels. In actual application, quantities of subchannels separately included in the available time-frequency resources may be the same or may be different.

It should be noted that when selecting, from the O subchannels, the subchannel included in the N time-frequency resources, the first communications device may sequentially select, from the O subchannels according to a subchannel number sequence, a subchannel that can meet a requirement for transmitting to-be-transmitted data. For example, the O subchannels are the CH1, the CH3, the CH6, and the CH7, where the CH1 forms an available time-frequency resource 1, the CH3 forms an available time-frequency resource 2, and the CH6 and the CH7 form an available time-frequency resource 3. A quantity of subchannels required for transmitting the to-be-transmitted data is 3, so that the first communications device sequentially screens the four subchannels according to the subchannel number sequence, and finally selects three nonconsecutive subchannels, the CH1, the CH3, and the CH6 to transmit the to-be-transmitted data.

Alternatively, when selecting the N time-frequency resources from the P subchannels, the first communications device may directly select, from a plurality of time-frequency resources corresponding to the O subchannels, a time-frequency resource that can meet the requirement for transmitting the to-be-transmitted data. For example, the P subchannels are the CH1, the CH3, the CH6, and the CH7, where the CH1 forms an available time-frequency resource 1, the CH3 forms an available time-frequency resource 2, the CH6 and the CH7 form an available time-frequency resource 3, and a quantity of subchannels required for transmitting to-be-transmitted data is 3. Each available time-frequency resource is insufficient to transmit a current data packet, but a total resource size of two nonconsecutive available time-frequency resources, including the time-frequency resource 1 and the time-frequency resource 3 or the time-frequency resource 2 and the time-frequency resource 3, can support transmission of the current data packet. In this case, the first communications device may select the two nonconsecutive available time-frequency resources: the time-frequency resource 1 and the time-frequency resource 3, to transmit the current data packet.

According to the method described in Embodiment 1, for a first communications device operating in the mode4 transmission mode, the first communications device autonomously selects N nonconsecutive time-frequency resources, generates first indication information, and notifies a second communications device of the N nonconsecutive time-frequency resources used for data transmission. Therefore, nonconsecutive time-frequency resource indication is supported, and is used for large data packet transmission, so that a transmission waiting delay of the data packet can be reduced, and the nonconsecutive time-frequency resources can be effectively used.

(2) Embodiment 2

This embodiment is mainly for a mode3 transmission mode. In an embodiment, a time-frequency resource used by the first communications device for communication is scheduled based on a network device, and the first communications device sends control information and data on the scheduled time-frequency resource based on scheduling information of the network device. In this case, this is mainly for a communications device that works in the mode3 transmission mode. The network device delivers second indication information to the first communications device, where the second indication information is used to indicate that the N time-frequency resources are used by the first communications device to send to-be-transmitted data. In this case, the first communications device determines the N time-frequency resources based on the second indication information delivered by the network device. Optionally, the second indication information may be carried in downlink control information (DCI) sent by the network device.

In this embodiment of this application, the second indication information includes but is not limited to the following two implementations.

(1) In a first implementation, the second indication information includes P bits corresponding to P time-frequency units; each bit is used to indicate whether one time-frequency unit is used by the first communications device to send the to-be-transmitted data; the P bits are used to indicate that a time-frequency unit that is included in the N time-frequency resources and that is in the P time-frequency units is used by the first communications device to send the to-be-transmitted data, and a time-frequency unit, other than the time-frequency unit included in the N time-frequency resources, in the P time-frequency units is not used by the first communications device to send the to-be-transmitted data; and P is a positive integer greater than or equal to N. The time-frequency unit may be but is not limited to a subchannel. For example, the time-frequency unit is a subchannel. For a V2X communications system, P subchannels may be all subchannels included in a communication resource pool used for V2X communication, and P is a total quantity of subchannels included in the communication resource pool. For a V2P communications system, P subchannels may be all subchannels included in a communication resource pool used for V2P communication, and P is a total quantity of subchannels included in the communication resource pool. For a V2I communications system, P subchannels may be all subchannels included in a communication resource pool used for V2I communication, and P is a total quantity of subchannels included in the communication resource pool. For a D2D communications system, P subchannels may be all subchannels included in a communication resource pool used for D2D communication, and P is a total quantity of subchannels included in the communication resource pool.

In this implementation, the bitmap is used to indicate transmission statuses of all subchannels. Herein, the bitmap includes the foregoing P bits, and each subchannel uses one bit to indicate whether the subchannel is used by the first communications device to send the to-be-transmitted data. For example, referring to FIG. 10A and FIG. 10B, it is assumed that a total quantity P of subchannels included in the communication resource pool is 8, and the eight subchannels are CH0 to CH7. It is assumed that there are two nonconsecutive available time-frequency resources in a subframe/slot, where a time-frequency resource 1 includes two subchannels CH1 and CH2, and a time-frequency resource 2 includes one subchannel CH7. Each available time-frequency resource is insufficient to transmit a current data packet, but a total resource size of the two nonconsecutive available time-frequency resources can support transmission of the current data packet. In this case, the network device indicates the first communications device to transmit the current data packet by using the two nonconsecutive available time-frequency resources. In this case, the bitmap bitmap including the P bits may be 01100001, indicating the first communications device to use the subchannel 1, the subchannel 2, and the subchannel 7 for transmission. A bit 0 indicates that a subchannel corresponding to the bit is not used by the first communications device to send the to-be-transmitted data. A bit 1 indicates that a subchannel corresponding to the bit is used by the first communications device to send the to-be-transmitted data. Subchannels corresponding to bits in the bitmap may be predefined in a communication protocol. For example, if subchannels are arranged in a sequence of CH0 to CH1, the first bit in the bitmap corresponds to the first subchannel CH0, and the second bit corresponds to the second subchannel CH1.

For example, the downlink control information carries the bitmap 01100001. The first communications device may learn of the bitmap by parsing the downlink control information, and further learn that subchannels included in the N time-frequency resources are the subchannel 1, the subchannel 2, and the subchannel 7. In this case, the first communications device determines to transmit the current data packet by using the subchannel 1, the subchannel 2, and the subchannel 7.

It should be noted that all the consecutive and/or nonconsecutive subchannels are indicated by using the bitmap. This manner is applicable to a system in which a frequency domain resource allocated to the V2X communication resource pool is not large and a quantity of subchannels is relatively small.

(2) In a second implementation, the second indication information includes N pieces of time-frequency resource indication information; and each piece of time-frequency resource indication information indicates at least one of a time domain starting position, a time domain ending position, a time domain length, a frequency domain starting position, a frequency domain ending position, and a frequency domain length of a time-frequency resource. For example, assuming that N is equal to 2, the N time-frequency resources include a time-frequency resource 1 and a time-frequency resource 2, and the N pieces of time-frequency resource indication information include two pieces of time-frequency resource indication information. One of the two pieces of time-frequency resource indication information is used to indicate a time domain starting position, a time domain ending position, a frequency domain starting position, and a frequency domain ending position of the time-frequency resource 1. The another piece of time-frequency resource indication information is used to indicate a time domain starting position, a time domain ending position, a frequency domain starting position, and a frequency domain ending position of the time-frequency resource 2. Alternatively, one of the two pieces of time-frequency resource indication information is used to indicate a time domain starting position, a time domain length, a frequency domain starting position, and a frequency domain length of the time-frequency resource 1. The another piece of time-frequency resource indication information is used to indicate a time domain starting position, a time domain length, a frequency domain starting position, and a frequency domain length of the time-frequency resource 2.

It should be further noted that, when time-frequency resources that are nonconsecutive in frequency domain are located in different frequency bands, different carriers, or different bandwidth parts, the time-frequency resource indication information further needs to indicate different frequency bands, different carriers, or different bandwidth parts.

In this embodiment of this application, the time domain starting position may be a starting position of a time domain resource such as a subframe, a slot, a mini-slot, or a symbol. The time domain ending position may be an ending position of a time domain resource such as a subframe, a slot, a mini-slot, or a symbol. The frequency domain starting position may be a starting position of a frequency domain resource such as a subcarrier, a resource block, or a subchannel. The frequency domain ending position may be an ending position of a frequency domain resource such as a subcarrier, or a subchannel. The time domain length may be consecutive symbols, mini-slots, slots, subframes, or frames in time domain, and the frequency domain length may be consecutive subcarriers, resource blocks, or subchannels in frequency domain.

For example, the downlink control information carries the N pieces of time-frequency resource indication information. The first communications device may learn of the N pieces of time-frequency resource indication information by parsing the downlink control information, and further learn that subchannels included in the N time-frequency resources are a subchannel 1, a subchannel 2, and a subchannel 7. In this case, the first communications device determines to transmit a current data packet by using the subchannel 1, the subchannel 2, and the subchannel 7.

It should be noted that, in Embodiment 2, first indication information carried in SA sent by the first communications device on a sidelink is generated based on the second indication information delivered by the network device, but a format used may be the same as or different from a format of the second indication information. For example, the second indication information sent by the network device indicates the N time-frequency resources by using the bitmap, but the first indication information sent by the first communications device indicates the N time-frequency resources in a manner of the N pieces of time-frequency resource indication information.

According to the method described in Embodiment 2, for a first communications device operating in the mode3 transmission mode, the second indication information delivered by the network device indicates the N nonconsecutive time-frequency resources, and the first communications device generates the first indication information based on the second indication information, to notify a second communications device of the N nonconsecutive time-frequency resources used for data transmission. Therefore, nonconsecutive time-frequency resource indication is supported, and is used for large data packet transmission, so that a transmission waiting delay of the data packet can be reduced, and the nonconsecutive time-frequency resources can be effectively used.

Figure 14:
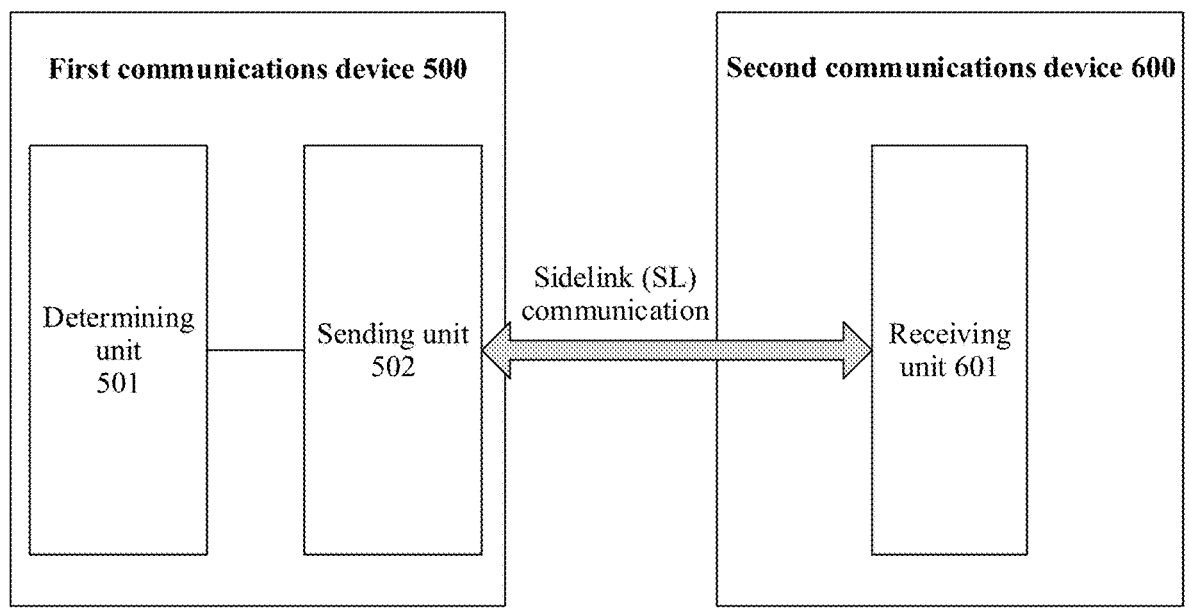
FIG. 14 is a functional block diagram of a first communications device and a second communications device in a wireless communications system according to an embodiment of this application.

FIG. 14 shows a wireless communications system, a first communications device, and a second communications device provided in this application. A wireless communications system 400 includes a first communications device 500 and a second communications device 600. The first communications device 500 may be the vehicle 202 or the vehicle 203 in the embodiment in FIG. 2. Correspondingly, the second communications device 600 may be the vehicle 203 or the vehicle 202 in the embodiment in FIG. 2. The wireless communications system 400 may be the communications system 200 described in FIG. 2. Descriptions are separately provided below.

As shown in FIG. 14, the first communications device 500 may include a determining unit 501 and a sending unit 502.

The determining unit 501 is configured to determine N time-frequency resources, where any two of the N time-frequency resources are nonconsecutive in at least one of a time domain and a frequency domain; each of the N time-frequency resources is smaller than a time-frequency resource required for transmitting to-be-transmitted data, and a sum of the N time-frequency resources is greater than or equal to the time-frequency resource required for transmitting the to-be-transmitted data; and N is a positive integer greater than or equal to 2.

The sending unit 502 is configured to send first indication information on M of the N time-frequency resources, where the first indication information is used to indicate that the N time-frequency resources are used by the first communications device to send the to-be-transmitted data, and M is a positive integer less than or equal to N.

The sending unit 502 is further configured to send the to-be-transmitted data on the N time-frequency resources.

Optionally, that the sending unit 502 is configured to send first indication information on M of the N time-frequency resources is: sending sidelink scheduling allocation information SA on M of the N time-frequency resources, where the SA carries the first indication information.

Optionally, the first indication information includes P bits corresponding to P time-frequency units; each bit is used to indicate whether one time-frequency unit is used by the first communications device to send the to-be-transmitted data; the P bits are used to indicate that a time-frequency unit that is included in the N time-frequency resources and that is in the P time-frequency units is used by the first communications device to send the to-be-transmitted data, and a time-frequency unit, other than the time-frequency unit included in the N time-frequency resources, in the P time-frequency units is not used by the first communications device to send the to-be-transmitted data; and P is a positive integer greater than or equal to N.

Optionally, the first indication information includes an identifier of the first communications device and an indicator; M is equal to N, and the identifier of the first communications device is used to indicate that the N time-frequency resources are used by the first communications device to send the to-be-transmitted data; and an indicator sent on a last time-frequency resource in the N time-frequency resources is different from an indicator sent on a non-last time-frequency resource in the N time-frequency resources.

Optionally, the first indication information includes N pieces of time-frequency resource indication information; and first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources.

Optionally, the determining unit 501 is configured to select, from O time-frequency units, the time-frequency unit included in the N time-frequency resources, and O is a positive integer greater than or equal to N.

Optionally, the first communications device 500 further includes:

a receiving unit, configured to receive second indication information sent by a network device, where the second indication information is used to indicate that the N time-frequency resources are used by the first communications device to send the to-be-transmitted data; and the determining unit 501 is configured to determine the N time-frequency resources based on the second indication information.

Optionally, the second indication information includes P bits corresponding to P time-frequency units; each bit is used to indicate whether one time-frequency unit is used by the first communications device to send the to-be-transmitted data; the P bits are used to indicate that a time-frequency unit that is included in the N time-frequency resources and that is in the P time-frequency units is used by the first communications device to send the to-be-transmitted data, and a time-frequency unit, other than the time-frequency unit included in the N time-frequency resources, in the P time-frequency units is not used by the first communications device to send the to-be-transmitted data; and P is a positive integer greater than or equal to N.

Optionally, the second indication information includes N pieces of time-frequency resource indication information; and first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources.

Optionally, the time-frequency unit includes a subchannel, and one subchannel includes one or more time-frequency resource blocks.

It can be understood that, for an implementation of the functional units included in the first communications device 400, refer to the foregoing embodiments, and details are not described herein again.

As shown in FIG. 14, the second communications device 600 may include a receiving unit 601.

The receiving unit 601 is configured to receive first indication information on M of N time-frequency resources, where the first indication information is used to indicate that the N time-frequency resources are used by a first communications device to send to-be-transmitted data; any two of the N time-frequency resources are nonconsecutive in at least one of a time domain and a frequency domain; each of the N time-frequency resources is smaller than a time-frequency resource required for transmitting the to-be-transmitted data, and a sum of the N time-frequency resources is greater than or equal to the time-frequency resource required for transmitting the to-be-transmitted data; and N is a positive integer greater than or equal to 2, and M is a positive integer less than or equal to N.

The receiving unit 601 is further configured to receive the to-be-transmitted data on the N time-frequency resources.

Optionally, that the receiving unit 601 is configured to receive first indication information on M of the N time-frequency resources is: receiving sidelink scheduling allocation information SA on M of the N time-frequency resources, where the SA carries the first indication information.

Optionally, the first indication information includes P bits corresponding to P time-frequency units; each bit is used to indicate whether one time-frequency unit is used by the first communications device to send the to-be-transmitted data; the P bits are used to indicate that a time-frequency unit that is included in the N time-frequency resources and that is in the P time-frequency units is used by the first communications device to send the to-be-transmitted data, and a time-frequency unit, other than the time-frequency unit included in the N time-frequency resources, in the P time-frequency units is not used by the first communications device to send the to-be-transmitted data; and P is a positive integer greater than or equal to N.

Optionally, the first indication information includes an identifier of the first communications device and an indicator; M is equal to N, and the identifier of the first communications device is used to indicate that the N time-frequency resources are used by the first communications device to send the to-be-transmitted data; and an indicator sent on a last time-frequency resource in the N time-frequency resources is different from an indicator sent on a non-last time-frequency resource in the N time-frequency resources.

Optionally, the first indication information includes N pieces of time-frequency resource indication information; and first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources.

Optionally, the time-frequency unit included in the N time-frequency resources is selected by the first communications device from O time-frequency units, and O is a positive integer greater than or equal to N.

Optionally, the N time-frequency resources are determined by the first communications device based on second indication information sent by a network device, and the second indication information is used to indicate that the N time-frequency resources are used by the first communications device to send the to-be-transmitted data.

Optionally, the second indication information includes P bits corresponding to P time-frequency units; each bit is used to indicate whether one time-frequency unit is used by the first communications device to send the to-be-transmitted data; the P bits are used to indicate that a time-frequency unit that is included in the N time-frequency resources and that is in the P time-frequency units is used by the first communications device to send the to-be-transmitted data, and a time-frequency unit, other than the time-frequency unit included in the N time-frequency resources, in the P time-frequency units is not used by the first communications device to send the to-be-transmitted data; and P is a positive integer greater than or equal to N.

Optionally, the second indication information includes N pieces of time-frequency resource indication information; and first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources.

Optionally, the time-frequency unit includes a subchannel, and one subchannel includes one or more time-frequency resource blocks.

It can be understood that, for an implementation of the functional units included in the second communications device 600, refer to the foregoing embodiments, and details are not described herein again.

Figure 15:
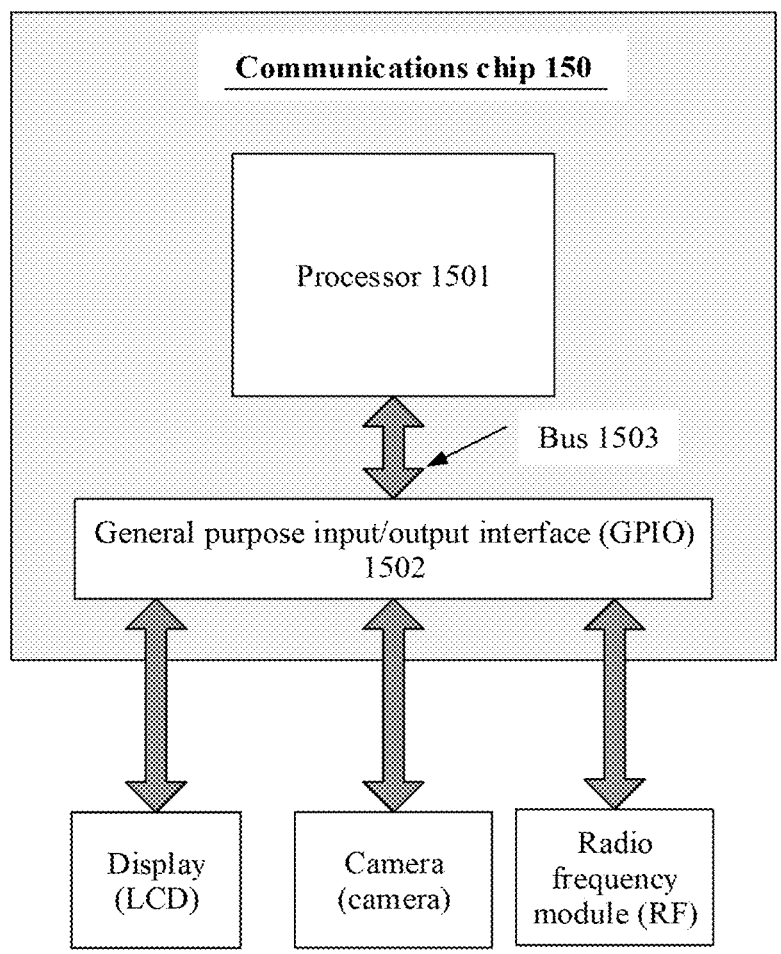
FIG. 15 is a schematic structural diagram of a communications chip according to an embodiment of this application.

FIG. 15 is a schematic structural diagram of a communications chip provided in this application. As shown in FIG. 15, a communications chip 150 may include a processor 1501 and one or more interfaces 1502 coupled to the processor 1501.

The processor 1501 may be configured to read and execute a computer-readable instruction. In an implementation, the processor 1501 may mainly include a controller, an arithmetic unit, and a register. The controller is mainly responsible for decoding an instruction, and sends a control signal for an operation corresponding to the instruction. The arithmetic unit is mainly responsible for performing a fixed-point or floating-point arithmetic operation, a shift operation, a logic operation, and the like, and may also perform an address operation and an address conversion. The register is mainly responsible for saving a quantity of register operations temporarily stored during instruction execution, intermediate operation results, and the like. In an implementation, a hardware architecture of the processor 1501 may be an application-specific integrated circuit (ASIC) architecture, an MIPS architecture, an ARM architecture, an NP architecture, or the like. The processor 1501 may be a single-core or multi-core processor.

The interface 1502 may be configured to input to-be-processed data to the processor 1501, and may output a processing result of the processor 1501 to the outside. In an implementation, the interface 1502 may be a general purpose input/output (GPIO) interface, and may be connected to a plurality of peripheral devices (such as a display (LCD), a camera (camera), and a radio frequency (RF) module). The interface 1502 is connected to the processor 1501 through a bus 1503.

In this application, the processor 1501 may be configured to: invoke, from a memory, a program for implementing, on a communications device side, the data transmission method provided in one or more embodiments of this application, and execute an instruction included in the program. The interface 1502 may be configured to output an execution result of the processor 1501. In this application, the interface 1502 may be configured to output a resource allocation result of the processor 1501. For the data transmission method provided in one or more embodiments of this application, refer to the foregoing embodiments. Details are not described herein again.

It should be noted that functions corresponding to the processor 1501 and the interface 1502 may be implemented by using a hardware design, or may be implemented by using a software design, or may be implemented by combining software and hardware. This is not limited herein.

In the specification, claims, and accompanying drawings of this application, the terms "first", "second", "third", "fourth" and so on are intended to distinguish between different objects but do not indicate a particular order. In addition, the terms "including", "having", or any other variant thereof, are intended to cover non-exclusive inclusion. For example, a process, a method, a system, a product, or a device that includes a series of operations or units is not limited to the listed operations or units, but optionally further includes an unlisted operation or unit, or optionally further includes another inherent operation or unit of the process, the method, the product, or the device.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

A person of ordinary skill in the art may understand that all or some of the processes of the methods in the embodiments may be implemented by a computer program instructing relevant hardware. The program may be stored in a computer-readable storage medium. When the program is run, the processes of the method embodiments are included. The foregoing storage medium may be: a magnetic disk, an optical disc, a read-only memory (ROM), a random access memory (RAM), or the like.

In the foregoing implementations, the objectives, technical solutions, and benefits of the embodiments of the invention are further described in detail. It should be understood that the foregoing descriptions are merely implementations of the embodiments of the invention, but are not intended to limit the protection scope of the embodiments of invention. Any modification, equivalent replacement, or improvement made based on technical solutions of the embodiments of the invention shall fall within the protection scope of the embodiments of the invention.

What is claimed is:

1. A data transmission method, comprising:
    determining, by a first communications device, N time-frequency resources, wherein any two of the N time-frequency resources are nonconsecutive in at least one of a time domain and a frequency domain; each of the N time-frequency resources is smaller than a time-frequency resource for transmitting to-be-transmitted data, and a sum of the N time-frequency resources is greater than or equal to the time-frequency resource for transmitting the to-be-transmitted data; and N is a positive integer greater than or equal to 2;
    sending, by the first communications device, a first indication information on M of the N time-frequency resources, wherein the first indication information is used to indicate that the N time-frequency resources are used by the first communications device to send the to-be-transmitted data, and M is a positive integer less than or equal to N; and
    sending, by the first communications device, the to-be-transmitted data on the N time-frequency resources.

2. The method according to claim 1, wherein the sending, by the first communications device, the first indication information on M of the N time-frequency resources comprises:
    sending, by the first communications device, a sidelink scheduling allocation information (SA) on M of the N time-frequency resources, wherein the SA carries the first indication information.

3. The method according to claim 1, wherein the first indication information comprises P bits corresponding to P time-frequency units; each bit is used to indicate whether one time-frequency unit is used by the first communications device to send the to-be-transmitted data; the P bits are used to indicate that a time-frequency unit that is comprised in the N time-frequency resources and that is in the P time-frequency units is used by the first communications device to send the to-be-transmitted data, and a time-frequency unit, other than the time-frequency unit comprised in the N time-frequency resources, in the P time-frequency units is not used by the first communications device to send the to-be-transmitted data; and P is a positive integer greater than or equal to N.

4. The method according to claim 1, wherein the first indication information comprises an identifier of the first communications device and an indicator; M is equal to N, and the identifier of the first communications device is used to indicate that the N time-frequency resources are used by the first communications device to send the to-be-transmitted data; and an indicator sent on a last time-frequency resource in the N time-frequency resources is different from an indicator sent on a non-last time-frequency resource in the N time-frequency resources.

5. The method according to claim 1, wherein the first indication information comprises N pieces of time-frequency resource indication information; and wherein a first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources.

6. The method according to claim 1, wherein the determining, by the first communications device, the N time-frequency resources comprises:
selecting, by the first communications device from O time-frequency units, the time-frequency unit comprised in the N time-frequency resources, wherein O is a positive integer greater than or equal to N.

7. The method according to claim 1, wherein before the determining, by the first communications device, the N time-frequency resources, the method further comprises:
receiving, by the first communications device, a second indication information sent by a network device, wherein the second indication information is used to indicate that the N time-frequency resources are used by the first communications device to send the to-be-transmitted data; and
the determining, by the first communications device, the N time-frequency resources comprises:
determining, by the first communications device, the N time-frequency resources based on the second indication information.

8. A data transmission method, comprising:
receiving, by a second communications device, a first indication information on M of N time-frequency resources, wherein the first indication information is used to indicate that the N time-frequency resources are used by a first communications device to send to-be-transmitted data; any two of the N time-frequency resources are nonconsecutive in at least one of a time domain and a frequency domain; each of the N time-frequency resources is smaller than a time-frequency resource for transmitting the to-be-transmitted data, and a sum of the N time-frequency resources is greater than or equal to the time-frequency resource for transmitting the to-be-transmitted data; and N is a positive integer greater than or equal to 2, and M is a positive integer less than or equal to N; and
receiving, by the second communications device, the to-be-transmitted data on the N time-frequency resources.

9. The method according to claim 8, wherein the receiving, by the second communications device, the first indication information on M of N time-frequency resources comprises:
receiving, by the second communications device, a sidelink scheduling allocation information SA on M of the N time-frequency resources, wherein the SA carries the first indication information.

10. The method according to claim 8, wherein the first indication information comprises P bits corresponding to P time-frequency units; each bit is used to indicate whether one time-frequency unit is used by the first communications device to send the to-be-transmitted data; the P bits are used to indicate that a time-frequency unit that is comprised in the N time-frequency resources and that is in the P time-frequency units is used by the first communications device to send the to-be-transmitted data, and a time-frequency unit, other than the time-frequency unit comprised in the N time-frequency resources, in the P time-frequency units is not used by the first communications device to send the to-be-transmitted data; and P is a positive integer greater than or equal to N.

11. The method according to claim 8, wherein the first indication information comprises an identifier of the first communications device and an indicator; M is equal to N, and the identifier of the first communications device is used to indicate that the N time-frequency resources are used by the first communications device to send the to-be-transmitted data; and an indicator sent on a last time-frequency resource in the N time-frequency resources is different from an indicator sent on a non-last time-frequency resource in the N time-frequency resources.

12. The method according to claim 8, wherein the first indication information comprises N pieces of time-frequency resource indication information; and wherein a first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources.

13. The method according to claim 8, wherein the time-frequency unit comprised in the N time-frequency resources is selected by the first communications device from O time-frequency units, and O is a positive integer greater than or equal to N.

14. The method according to claim 8, wherein the N time-frequency resources are determined by the first communications device based on a second indication information sent by a network device, and the second indication information is used to indicate that the N time-frequency resources are used by the first communications device to send the to-be-transmitted data.

15. A first communications device, comprising:
a determining unit, configured to determine N time-frequency resources, wherein any two of the N time-frequency resources are nonconsecutive in at least one of a time domain and a frequency domain; each of the N time-frequency resources is smaller than a time-frequency resource for transmitting to-be-transmitted data, and a sum of the N time-frequency resources is greater than or equal to the time-frequency resource for transmitting the to-be-transmitted data; and N is a positive integer greater than or equal to 2; and
a sending unit, configured to send a first indication information on M of the N time-frequency resources, wherein the first indication information is used to indicate that the N time-frequency resources are used by the first communications device to send the to-be-transmitted data, and M is a positive integer less than or equal to N; and
the sending unit is further configured to send the to-be-transmitted data on the N time-frequency resources.

16. The first communications device according to claim 15, wherein the sending the first indication information on M of the N time-frequency resources comprises sending a sidelink scheduling allocation information (SA) on M of the N time-frequency resources, wherein the SA carries the first indication information.

17. The first communications device according to claim 15, wherein the first indication information comprises P bits corresponding to P time-frequency units; each bit is used to indicate whether one time-frequency unit is used by the first communications device to send the to-be-transmitted data; the P bits are used to indicate that a time-frequency unit that is comprised in the N time-frequency resources and that is in the P time-frequency units is used by the first communications device to send the to-be-transmitted data, and a time-frequency unit, other than the time-frequency unit comprised in the N time-frequency resources, in the P time-frequency units is not used by the first communications device to send the to-be-transmitted data; and P is a positive integer greater than or equal to N.

18. The first communications device according to claim 15, wherein the first indication information comprises an identifier of the first communications device and an indicator; M is equal to N, and the identifier of the first communications device is used to indicate that the N time-frequency resources are used by the first communications device to send the to-be-transmitted data; and an indicator sent on a last time-frequency resource in the N time-frequency resources is different from an indicator sent on a non-last time-frequency resource in the N time-frequency resources.

19. The first communications device according to claim 15, wherein the first indication information comprises N pieces of time-frequency resource indication information; and wherein a first time-frequency resource indication information is used to indicate at least one of a time domain starting position, a time domain ending position, a time domain length, a frequency domain starting position, a frequency domain ending position, and a frequency domain length of a first time-frequency resource, the first time-frequency resource indication information belongs to the N pieces of time-frequency resource indication information, and the first time-frequency resource belongs to the N time-frequency resources.

20. The first communications device according to claim 15, wherein the determining unit is configured to select, from O time-frequency units, the time-frequency unit comprised in the N time-frequency resources, and O is a positive integer greater than or equal to N.

* * * * *